US008831762B2

(12) United States Patent
Abe et al.

(10) Patent No.: US 8,831,762 B2
(45) Date of Patent: Sep. 9, 2014

(54) MUSIC AUDIO SIGNAL GENERATING SYSTEM

(75) Inventors: Takehiro Abe, Osaka (JP); Naoki Yasuraoka, Shizuoka (JP); Katsutoshi Itoyama, Kyoto (JP); Hiroshi Okuno, Kyoto (JP)

(73) Assignee: Kyoto University, Kyoto-Shi (JP)

( * ) Notice: Subject to any disclaimer, the term of this patent is extended or adjusted under 35 U.S.C. 154(b) by 471 days.

(21) Appl. No.: 13/201,757

(22) PCT Filed: Feb. 16, 2010

(86) PCT No.: PCT/JP2010/052293
§ 371 (c)(1),
(2), (4) Date: Oct. 25, 2011

(87) PCT Pub. No.: WO2010/095622
PCT Pub. Date: Aug. 26, 2010

(65) Prior Publication Data

US 2012/0046771 A1 Feb. 23, 2012

(30) Foreign Application Priority Data

Feb. 17, 2009 (JP) ................................ 2009-034664

(51) Int. Cl.
*G06F 17/00* (2006.01)
*G10H 1/16* (2006.01)
*G10L 25/90* (2013.01)
*G10L 21/013* (2013.01)

(52) U.S. Cl.
CPC ........... *G10H 1/16* (2013.01); *G10H 2210/066* (2013.01); *G10L 25/90* (2013.01); *G10L 2021/0135* (2013.01); *G10H 2250/615* (2013.01)
USPC ................................. 700/94; 84/623; 84/627

(58) Field of Classification Search
None
See application file for complete search history.

(56) References Cited

U.S. PATENT DOCUMENTS

| | | | | |
|---|---|---|---|---|
| 5,536,902 | A * | 7/1996 | Serra et al. | 84/623 |
| 6,836,761 | B1 * | 12/2004 | Kawashima et al. | 704/258 |
| 2005/0283361 | A1 | 12/2005 | Yoshii et al. | |

FOREIGN PATENT DOCUMENTS

| | | |
|---|---|---|
| EP | 2148321 | 1/2010 |
| JP | 05-188931 | 7/1993 |

(Continued)

OTHER PUBLICATIONS

Yoshii, et al., "Drumix: An Audio Player with Real-time Drum-part Rearrangement Functions for Active Music Listening", IPSJ Journal, vol. 48, No. 3, Mar. 2007, pp. 1229-1239.

(Continued)

*Primary Examiner* — Andrew C Flanders
*Assistant Examiner* — David Siegel
(74) *Attorney, Agent, or Firm* — Rankin, Hill & Clark LLP

(57) ABSTRACT

A system for timbral change, capable of changing timbres included in an existing music audio signal to arbitrary timbres. Replaced harmonic peak parameters are created by replacing a plurality of harmonic peaks included in harmonic peak parameters, which are stored in a separated audio signal analyzing and storing section 3 and indicate relative amplitudes of n-th order harmonic components of each tone generated by a musical instrument of a first kind, with harmonic peaks included in harmonic peak parameters, which are stored in a replacement parameter storing section 6 and indicate relative amplitudes of n-th order harmonic components of each tone generated by a musical instrument of a second kind and corresponding to each tone generated by the musical instrument of the first kind. A synthesized separated audio signal generating section 7 generates a synthesized separated audio signal for each tone using parameters other than the harmonic peak parameters and the replaced harmonic peak parameters.

20 Claims, 18 Drawing Sheets

(56) References Cited

FOREIGN PATENT DOCUMENTS

| | | |
|---|---|---|
| JP | 2002-529773 | 9/2002 |
| JP | 2006-005807 | 1/2006 |
| JP | 2007-017818 | 1/2007 |
| WO | 00/26897 | 5/2000 |
| WO | 2008/133097 | 11/2008 |

OTHER PUBLICATIONS

Itoyama, et al., "Simultanious Realization of Score-informed Sound Source Separation of Polyphonic Musical Signals and Constrained Parameter Estimation for Integrated Model of Harmonic and Inharmonic Structure", Trans. IPS Japan, vol. 49, No. 3, Mar. 2008; pp. 1465-1479.

Abe, et al., "A Method for Manipulating Pitch and Duration of Musical Instrument Sounds Dealing with Pitch-Dependency of Timbre", SIGNUS Journal, vol. 76, 2008, pp. 155-160.

Abe, et al., "Analysis-and-Manipulation Approach to Pitch and Duration of Musical Instrument Sounds without Distorting Timbral Characteristics", Proc. of the 11th Int. Conference on Digital Audio Effects, Espoo, Finland, Sep. 2008.

Kawahara, "Straight: Exploitation of the other Aspect of VOCODER", Journal of the Acoustical Society of Japan, vol. 63, No. 8, 2007, pp. 442-449.

Abe, et al., "An Analysis-and-Synthesis Approach for Manipulating Pitch of a Musical Instrument Sound Considering Pitch-Dependency of Timbral Characteristics", Trans. IPS Japan vol. 50, No. 3, Mar. 2009, pp. 1054-1066.

* cited by examiner

Spectral Envelope $F_n$

Temporal Envelope $E_n$

MUSIC AUDIO SIGNAL GENERATING SYSTEM

TECHNICAL FIELD

The present invention relates to a music audio signal generating system capable of changing timbres of music audio signals and a method therefor, and a computer program for music audio signal generation installed in a computer to cause the computer to implement the method therefor.

BACKGROUND ART

New equalizers have recently been developed to specialize in music audio signals. Such new technique is called as a musical instrument equalizer which is capable of manipulating the volume and replacing the timbres of individual musical instrument parts. While equalizers installed inmost of audio players change musical sounds by manipulating the frequency range, musical instrument equalizers change musical sounds by manipulating the individual musical instrument parts. Such musical instrument equalizers are expected to expand the scope of music appreciation. The music instrument equalizer of Yoshii et al. called Drumix, as shown in non-patent document 1, successfully manipulates the volume and changes the timbres of percussive instruments such as snare and bass drums. The music instrument equalizer of Itoyama et al., as shown in non-patent document 2, is capable of manipulating the volumes of all musical instrument parts including percussive instruments. Unlike Yoshii's Drumix, however, Itoyama's equalizer does not manipulate the timbres of musical instrument parts. An invention based on non-patent document 2 has been included in PCT/JP2008/57310 as identified WO2008/133097 (patent document 1).

BACKGROUND ART DOCUMENTS

Patent Document

Patent Document 1: WO2008/133097

Non-Patent Documents

Non-Patent Document 1: Yoshii, K., Goto, M. and G., O. H., "Drumix: An Audio Player with Realtime Drum-part Rearrangement Functions for Active Music Listening", IPSJ Journal, Vol. 48, No. 3, pp. 1229-1239 (2007)

Non-Patent Document 2: Katsutoshi Itoyama, Masataka Goto, Kazunori Komatani, Tetsuya Ogata, and Hiroshi Okuno, "Simultaneous Realization of Score-Informed Sound Source Separation of Polyphonic Musical Signals and Constrained Parameter, Estimation for Integrated Model of Harmonic and Inharmonic Structure", IPSJ Journal, Vol. 49, No. 3, pp. 1465-1479 (2008)

Non-Patent Document 3: Takehiro Abe, Katsutoshi Itoyama, KazuyoshiYoshii, KazunoriKomatani, Tetsuya Ogata, and Hiroshi Okuno, "A Method for Manipulating Pitch and Duration of Musical Instrument Sounds Dealing with Pitch-dependency of Timbre", SIGMUS Journal, Vol. 76, pp. 155-160 (2008)

Non-Patent Document 4: Abe, T., Itoyama, K., Komatani, K., Ogata, T. and Okuno, H. G., "Analysis and Manipulation Approach to Pitch and Duration of Musical Instrument Sounds without Distorting Timbral Characteristics, International Conference on Digital Audio Effects", Vol. 11, pp. 249-256 (2008)

Non-Patent Document 5: Hideki Kawahara, "STRAIGHT, Exploitation of the other aspect of VOCODER", ASJ Journal, Vol. 63, No. 8, pp. 442-449 (2007)

Non-Patent Document 6: Takehiro Abe, Katsutoshi Itoyama, Kazuyoshi Yoshii, Kazunori Komatani, Tetsuya Ogata, and Hiroshi Okuno, "A Method for Manipulating Pitch of Musical Instrument Sounds Dealing with Pitch-Dependency of Timbre", IPSJ Journal, Vol. 50, No. 3, (2009)

DISCLOSURE OF INVENTION

Technical Problem

Conventional techniques fail to change the timbres of arbitrary musical instrument parts as a user likes. The conventional techniques also fail to synthesize audio signals with music performance expressions for unknown musical scores.

An object of the present invention is to provide a music audio signal generating system capable of changing the timbres of arbitrary musical instrument parts of known music audio signals into arbitrary timbres and a method therefore, and a computer program for music audio signal generation installed in a computer to cause the computer to implement the method therefor.

Another object of the present invention is to provide a music audio signal generating system capable of synthesizing audio signals of musical instrument performance with performance expressions for unknown musical scores by using the timbres of arbitrary musical instrument parts of known music audio signals.

Solution to Problem

If the timbres of arbitrary musical instrument parts can be changed as the user or likes, for example, the user can enjoy a classical remix of rock music or classically arranged rock music by replacing the musical instrument sounds of a guitar, a bass, a keyboard, etc. that compose the rock music with the musical instrument sounds of a violin, a wood bass, a piano, etc. Also, the user can have his/her favorite guitarist virtually play various favorite phrases by extracting guitar sounds from a tune or musical piece played by his/her favorite guitarist and replacing the guitar part of another tune or musical piece with the extracted guitar sounds. Further, synthesis of intermediate tones from target sounds to be replaced may expand timbral variation and simultaneously enable a wide scope of music appreciation.

According to a first invention claimed in this application, a basic system for music audio signal generation comprises a signal extracting and storing section, a separated audio signal analyzing and storing section, a replacement parameter storing section, a replaced parameter creating and storing section, a synthesized separated audio signal generating section, and a signal adding section.

The signal extracting and storing section is configured to extract a separated audio signal for each tone from a music audio signal including an audio signal of musical instrument sounds generated by a musical instrument of a first kind. Then, the signal extracting and storing section stores the extracted separated audio signal for each tone of the musical instrument sounds. It also stores a residual audio signal. The separated audio signal refers to an audio signal including only the tones of the musical instrument sounds generated by the musical instrument of the first kind. The residual audio signal includes an audio signal including other audio signals such as audio signals of other musical instrument sounds. The music audio signal may be an audio signal separated from a polyphonic audio signal including audio signals of musical instrument sounds generated by a plurality of kinds of musical instruments, or may be an audio signal including only audio signals of musical instrument sounds generated by a single musical instrument that are obtained by playing the single musical instrument. In order to separate from a polyphonic audio signal a target audio signal of which the timbre should be replaced, an audio signal separating section may be provided to perform a known audio signal separation technique. If the sound separating technique, which has been proposed by Itoyama et al. and described in non-patent document 2, is employed to separate a music audio signal from a polyphonic audio signal, audio signals of other musical instrument parts may be separated independently from each other, and simultaneously various parameters such as harmonic peak parameters may be analyzed.

The separated audio signal analyzing and storing section is configured to analyze a plurality of parameters for each of the plurality of tones included in the separated audio signal and then store the plurality of parameters for each tone in order to represent the separated audio signal for each tone using a harmonic model that is formulated by the plurality of parameters. The plurality of parameters include at least harmonic peak parameters indicating relative amplitudes of n-th order harmonic or overtone components (generally, n harmonic peak parameters for n harmonic components of one tone) and power envelope parameters indicating temporal power envelopes of the n-th order harmonic components (generally, the same number of power envelope parameters as the harmonic peaks for one tone). Such harmonic model comprised of a plurality of parameters is shown in detail in non-patent document 2 and patent document 1, PCT/JP2008/57310 (WO2008/133097). The harmonic model is not limited to the model shown in non-patent document 2, but should be comprised of a plurality of parameters including at least harmonic peak parameters indicating relative amplitudes of n-th order harmonic components and power envelope parameters indicating temporal power envelopes of the n-th order harmonic components. For example, if the musical instrument of the first kind is a string instrument, accuracy of creating parameters may be increased by using a harmonic model having inharmonicity of a harmonic structure incorporated thereinto. In the harmonic structure of string instrument sounds, the overtones are not exact integral multiples of fundamental frequency, and the frequency of each harmonic peak is slightly higher depending upon the stiffness and length of the string. This is called inharmonicity. The higher the frequency is, the more influential inharmonicity will be. Then, even if the musical instrument of the first kind is a string instrument, the parameters may be determined, taking it into consideration that the harmonic peak shifts toward higher frequency, by using the harmonic model having such inharmonicity incorporated thereinto. The harmonic model having inharmonicity incorporated thereinto may be used not only in analysis but also in synthesis. When such harmonic model is used in synthesis, a variable indicating the inharmonicity of a harmonic structure, namely, the degree of inharmonicity, may be predicted by using a pitch-dependent feature function.

One harmonic peak parameter may typically be represented as a real number indicating the amplitude of a harmonic peak appearing in the frequency domain. A power envelope parameter indicates temporal change of each harmonic peak power included in n harmonic peak parameters indicating the relative amplitudes of n-th order harmonic components and appearing at the same point of time. The powers of a plurality of harmonic peaks have the same frequency but appear at different points of time. This is not limited to the power envelope parameter shown in non-patent document 2. The power envelope parameters for different audio signals take a similar shape at each frequency if the audio signals include musical instrument sounds generated by musical instruments which belong to the same category of musical instruments. For example, the power envelope parameter for a tone of the piano or percussive or string musical instrument has a pattern of change in which it significantly attacks and then decays. The power envelope parameter for a tone of the trumpet or wind or non-percussive musical instrument has a pattern of change having a gradual changing portion or a steady segment between the attack and decay segments. The harmonic peak parameters and power envelope parameters may be stored in an arbitrary data format.

The replacement parameter storing section is configured to store harmonic peak parameters indicating relative amplitudes of n-th order harmonic components of a plurality of tones generated by a musical instrument of a second kind. The harmonic peak parameters are created from an audio signal of musical instrument sounds generated by the musical instrument of the second kind that is different from the musical instrument of the first kind. The harmonic peak parameters thus created are required to represent, using the harmonic model, audio signals of the plurality of tones generated by the musical instrument of the second kind and corresponding to all of the tones included in the separated audio signal. The harmonic peak parameters indicating the relative amplitudes of the n-th order harmonic components of the plurality of tones generated by the musical instrument of the second kind may be created in advance, and may be prepared in an arbitrary data format including a real number and a function. It is not necessary to prepare the audio signals for all of the tones generated by the musical instrument of the second kind and corresponding to all of the tones stored in the signal extracting and storing section. It is sufficient to prepare audio signals for at least two tones that are used as audio signals for the musical instrument sounds generated by the musical instrument of the second kind. The harmonic peak parameters for remaining tones may be created by using an interpolation method. The more tones available for interpolation, the higher accuracy for crating the parameters for the remaining tones will be.

The replaced parameter creating and storing section is configured to create replaced harmonic peak parameters by replacing a plurality of harmonic peaks included in the harmonic peak parameters, which are stored in the separated audio signal analyzing and storing section and indicate the relative amplitudes of the n-th order harmonic components of each tone generated by the musical instrument of the first kind, with harmonic peaks included in the harmonic peak parameters, which are stored in the replacement parameter storing section and indicate the relative amplitudes of the n-th order harmonic components of each tone generated by the musical instrument of the second kind and corresponding to each tone generated by the musical instrument of the first kind, and then store the replaced harmonic peak parameters thus created. In this manner, all of the harmonic peak parameters are replaced by the harmonic peak parameters obtained from the musical instrument sounds of the musical instrument of the second kind, thereby creating the replaced harmonic peak parameters.

The synthesized separated audio signal generating section is configured to generate a synthesized separated audio signal for each tone, using parameters other than the harmonic peak parameters, which are stored in the separated audio signal analyzing and storing section, and the replaced harmonic peak parameters stored in the replaced parameter creating and storing section. Then, the signal adding section is configured to add the synthesized separated audio signal and the residual audio signal to output a music audio signal including the audio signal of music instrument sounds generated by the musical instrument of the second kind.

The present invention allows timbral change or manipulation of timbres by replacing or changing parameters relating to timbres among a plurality of parameters that construct a harmonic model. Thus, the present invention readily enables timbral change in different musical instrument parts. If the pattern of change for a power envelope parameter obtained from a tone generated by the musical instrument of the first kind is approximate to the pattern of change for a power envelope parameter obtained from a tone generated by the musical instrument of the second kind, accuracy of timbral change is increased. In the contrary case where the two patterns of change are significantly different, the timbres are changed, but changed timbres have a feel or atmosphere of the musical instrument sounds generated by the musical instrument of the first kind rather than the musical instrument of the second kind. In some cases, however, the user may prefer the latter timbral change. In order to increase the accuracy of timbral change, the timbres should preferably be changed or replaced between musical instruments with the power envelope parameters having a common pattern of change.

In a second invention claimed in this application, a replacement parameter storing section is configured to store not only harmonic peak parameters indicating relative amplitudes of n-th order harmonic components of a plurality of tones generated by a musical instrument of a second kind but also power envelope parameters indicating temporal power envelopes of the n-th order harmonic components. Further, a replaced parameter creating and storing section of the second invention is configured to create and store replaced power envelope parameters in addition to replaced harmonic peak parameters. The replaced power envelope parameters are created by replacing the power envelope parameters, which are stored in the separated audio signal analyzing and storing section and indicate the temporal power envelopes of the n-th order harmonic components of each tone generated by the musical instrument of the first kind, with the power envelope parameters, which are stored in the replacement parameter storing section and indicate the temporal power envelopes of the n-th order harmonic components of each tone generated by the musical instrument of the second kind and corresponding to each tone generated by the musical instrument of the first kind. The replaced power envelope parameters thus created are stored in the replaced parameter creating and storing section. If it is necessary to have the two power envelope parameters coincide with each other in terms of temporal length, the power envelopes are appropriately expanded or shrunk such that the onset and offset of the power envelope parameter for the musical instrument of the second kind may coincide with those of the power envelope parameter for the separated audio signal. This duration manipulation is described in non-patent document 3.

A synthesized separated audio signal generating section of the second invention is configured to generate a synthesized separated audio signal for each tone using parameters other than the harmonic peak parameters and the power envelope parameters, which are stored in the separated audio signal analyzing and storing section, as well as the replaced harmonic peak parameters and the replaced power envelope parameters stored in the replaced parameter creating and storing section. Other elements are the same as those of the first invention. In this manner, replacements of not only harmonic peaks but also the power envelope parameters are performed. Specifically, the pattern of change for the power envelope parameters for each tone generated by the musical instrument of the second kind is used instead of the pattern of change for the power envelope parameters for each tone generated by the musical instrument of the first kind. Thus, the accuracy of timbral change may consequently be increased.

In a third invention claimed in this application, a musical instrument category determining section is provided in addition to the limitations of the second invention. The musical instrument category determining section is configured to determine whether or not the musical instrument of the first kind and the musical instrument of the second kind belong to the same category of musical instruments. A synthesized separated audio signal generating section of the third invention is configured to generate a synthesized separated audio signal for each tone using the parameters other than the harmonic peak parameters, which are stored in the separated audio signal analyzing and storing section, and the replaced harmonic peak parameters stored in the replaced parameter creating and storing section if the music instrument category determining section determines that the musical instrument of the first kind and the musical instrument of the second kind belong to the same category. If the music instrument category determining section determines that the musical instrument of the first kind and the musical instrument of the second kind belong to different categories, the synthesized separated audio signal generating section of the third invention uses parameters other than the harmonic peak parameters and the power envelope parameters, which are stored in the separated audio signal analyzing and storing section, as well as the replaced harmonic peak parameters and the replaced power envelope parameters stored in the replaced parameter creating and storing section to generate a synthesized separated audio signal for each tone. In this configuration, optimal timbral change may automatically be performed regardless of the category of musical instruments to which the musical instrument of the second kind belongs to.

In the third invention, in addition to the provision of the musical instrument category determining section, the separated audio signal analyzing and storing section may further have a function of analyzing and storing an inharmonic component distribution parameter indicating the distribution of inharmonic components of each tone. In this configuration, a replaced parameter creating and storing section of the third invention further has a function of creating a replaced inharmonic component distribution parameter indicating the distribution of inharmonic components of each tone by replacing the inharmonic component distribution parameter, which is stored in the separated audio signal analyzing and storing section, for each tone included in the musical instrument sounds generated by the musical instrument of the first kind with the inharmonic component distribution parameter, which is stored in the replacement parameter storing section, for each tone included in the musical instrument sounds generated by the musical instrument of the second kind and corresponding to each tone generated by the musical instrument of the first kind, and then storing the replaced inharmonic component distribution parameter thus created. In other words, the replaced inharmonic component distribution parameter is an inharmonic component distribution parameter for each tone generated by the musical instrument of the second kind wherein the onset of each tone generated by the musical instrument of the second kind is aligned with that of each tone generated by the musical instrument of the first kind. Then, a synthesized separated audio signal generating section of the third invention is configured to generate a synthesized separated audio signal for each tone, using parameters other than the harmonic peak parameter, the power envelope parameter, and the inharmonic component distribution parameter, which are stored in the separated audio signal analyzing and storing section, as well as the replaced harmonic peak parameter, the replaced power envelope parameter, and the replaced inharmonic component distribution parameter that are stored in the replaced parameter creating and storing section. In this configuration, the accuracy of timbral change or manipulation of timbres is furthermore increased since inharmonic components are taken into consideration in timbral change. The inharmonic component distribution parameter, however, is not so influential on the timbral manipulation. Therefore, it is not always necessary to take account of the inharmonic component distribution parameter. For the replacement of the inharmonic component distribution parameters, it is necessary to include not only harmonic components but also inharmonic components in the separated audio signal. When dealing with the inharmonic component distribution parameters, it is necessary to employ an integrated model of a harmonic model and an inharmonic model as shown in non-patent document 2. If the music audio signal does not include polyphonic sounds but only monophonic sounds generated by a musical instrument of a single kind, the residual signal can be considered as including only inharmonic components. In this case, the replacement of inharmonic distribution parameters can be performed without using the integrated model shown in non-patent document 2.

The replacement parameter storing section of the third invention further has a function of storing an inharmonic component distribution parameter indicating the distribution of inharmonic components of each of the tones of a plurality of kinds included in the audio signal of the musical instrument sounds generated by the musical instrument of the second kind. The replacement parameter storing section may further comprise a parameter analyzing and storing section and a parameter interpolation creating and storing section. The parameter analyzing and storing section is configured to analyze and store at least harmonic peak parameters for tones of the plurality of kinds that are obtained from an audio signal of musical instrument sounds generated by the musical instrument of the second kind. The harmonic peak parameters indicate relative amplitudes of n-th order harmonic components for each tone and are required to represent, using the harmonic model, a separated audio signal for each tone obtained from an audio signal of musical instrument sounds generated by the musical instrument of the second kind. The power envelope parameters indicating temporal power envelopes of the n-th order harmonic components for each of tones of the plurality of kinds, which are generated by the musical instrument of the second kind, are stored in the parameter analyzing and storing section together with the harmonic peak parameters obtained in advance by analyzing. The parameter analyzing and storing section also stores the inharmonic component distribution parameters. The parameter interpolation creating and storing section is configured to create the harmonic peak parameters and the power envelope parameters by an interpolation method for each of the tones of the plurality of kinds, based on the harmonic peak parameters and the power envelope parameters, which are stored in the parameter analyzing and storing section, for each of the tones of the plurality of kinds. The harmonic peak parameters and the power envelope parameters are required to represent, using the harmonic model, an audio signal of tones other than the tones of the plurality of kinds among the tones generated by the musical instrument of the second kind and corresponding to all of the tones included in the separated audio signal. Then, the harmonic peak parameters and the power envelope parameters thus created are stored in the parameter interpolation creating and storing section. In this configuration, parameters required for the replacement may be obtained even if there are few data on the tones generated by the musical instrument of the second kind. Further, the parameter analyzing and storing section may store the power envelope parameters indicating temporal power envelopes of the n-th order harmonic components, which are obtained by analysis, as representative power envelope parameters.

The replacement parameter storing section may further comprise a function generating and storing section configured to store the harmonic peak parameters for each tone generated by the music instrument of the second kind as pitch-dependent feature functions, based on data stored in the parameter analyzing and storing section and the parameter interpolation creating and storing section. In this configuration, the replaced parameter creating and storing section may preferably be configured to acquire a plurality of harmonic peaks included in the harmonic peak parameters for each tone generated by the music instrument of the second kind from the pitch-dependent feature functions. This configuration may reduce the amount of data to be stored. Further, the acquisition of data from the functions is expected to reduce errors in analyzing a plurality of learning data.

A plurality of parameters to be analyzed by the separated audio signal analyzing and storing section may include pitch parameters relating to pitches and duration parameters relating to durations including power envelope parameters. In this case, a pitch manipulating section configured to manipulate the pitch parameters and a duration manipulating section configured to manipulate the duration parameters may preferably be provided. This configuration enables change or manipulation of pitches and durations in addition to the timbral change or manipulation.

If a plurality of parameters to be analyzed by the separated audio signal analyzing and storing section can be obtained specifically for each tone generated by the musical instrument of the first kind, a musical score manipulating section may be provided for composing pitch parameters relating to pitches, duration parameters relating to durations, and timbre parameters relating to timbres of each tone in a musical score of an arbitrary structure, based on the association between the musical score structure and the acoustic characteristics.

On an assumption that a musical score of a similar structure is played with similar tones, the musical score manipulating section creates pitch parameters relating to pitches, duration parameters relating to durations, and timbre parameters relating to timbres that are suitable to each tone in a musical score of an arbitrary musical structure specified by the user, by utilizing all of the pitch parameters, duration parameters, and timbre parameters for each tone in a musical score played with the musical instrument of the first kind. The term "suitable" used herein may be defined based on a difference in pitch of tones preceding and following a focused tone.

The music audio signal generating system of the present invention may further comprise a musical score manipulating section configured to generate an audio signal of musical instrument sounds generated by the musical instrument of the first or second kind when a musical score is played with the musical instrument of the first or second kind, by utilizing the plurality of parameters for each tone stored in the separated audio signal analyzing and storing section. The musical score manipulating section is configured to create pitch parameters relating to pitches, duration parameters relating to durations, and timbre parameters relating to timbres among parameters that construct a harmonic model such that the created parameters may be suitable to each tone in a musical structure of another musical score.

The musical score manipulating section may work to include the functions of the pitch manipulating section and the duration manipulating section. If a musical score of an arbitrary structure specified by the user is similar to a musical score played with the musical instrument of the first kind, more accurate manipulation can be expected by using the functions of the pitch manipulating section and the duration manipulating section to change the pitch parameter and duration parameter for each tone in the musical score of an arbitrary structure specified by the user. In this case, preferably, the pitch manipulating section and/or the duration manipulating section should appropriately be used according to the sounds that user desires to produce.

DESCRIPTION OF EMBODIMENTS

Figure 1:
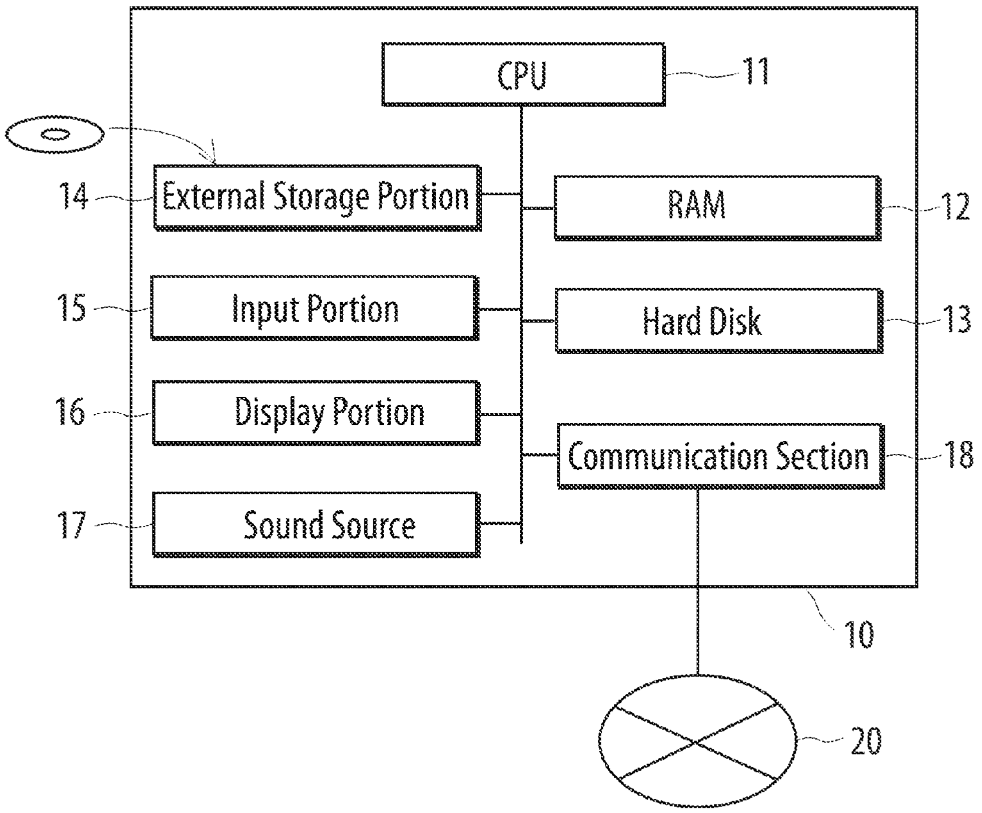
FIG. 1 is a block diagram showing an example configuration of a music audio signal generating system to be implemented in a computer according to an embodiment of the present invention.

Now, embodiments of the present invention will be described below in detail. FIG. 1 is a block diagram showing an example configuration of a music audio signal generating system to be implemented in a computer 10 according to an embodiment of the present invention. The computer comprises a CPU (Central Processing Unit) 11, a RAM (Random Access Memory) 12, a hard disk drive (hereinafter referred to as a hard disk or other mass storage means 13, an external storage portion 14 such as a flexible disk drive or CD-ROM drive, and a communication section 18 for communicating with a communication network 20 such as a LAN (Local Area Network) or Internet. The computer 10 also comprises an input portion 15 such as a keyboard and a mouse and a display portion 16 such as a liquid crystal display. The computer 10 has a sound source 17 such as a MIDI sound source mounted thereon.

The CPU 11 works as a computing means for executing the steps of separating power spectrum, estimating update model parameters (or adapting a model), and changing (or manipulating) timbres.

The sound source 17 includes input audio signals as described later. The sound source also includes standard MIDI files (SMF), which are temporally synchronized with input audio signals for sound separation, as musical score information data. The SMF is recorded in the hard disk 13 via a CD-ROM or a communication network 20. The term "temporally synchronized" used herein means that the onset time (or the start time of a steady segment) and duration of a tone, which corresponds to a note in a musical score, of each musical instrument part in a SMF is completely synchronized with the onset time and duration of a tone of each musical instrument part in an audio signal of an actual input musical piece.

MIDI signal recording, editing and reproduction are performed by a sequencer or sequence software, of which illustrations are omitted. A MIDI signal is handled as a MIDI file. SMF is a basic format for recording musical score performance data of a MIDI sound source. An SMF is constituted from data units called "chunk" which is a unified standard for maintaining compatibility of MIDI files between different sequencers or sequence software. Events of MIDI file data in an SMF format are largely grouped into three kinds, an MIDI event (MIDI Event), a system exclusive event (SysEx Event), and a meta event (Meta Event). The MIDI event shows musical performance data. The system exclusive event primarily shows a system exclusive message of a MIDI. The system exclusive message is used to exchange information present only in a particular musical instrument, or to distribute or convey particular non-musical information or event information. The meta event shows information on general performance such as temp and beats and additional information such as lyrics and copyrights used by a sequencer or sequence software. All of meta events begin with 0xFF, followed by bytes representing an event type and then data length and data. An MIDI performance program is designed to ignore meta events which cannot be identified by the program. Timing information is attached to each event to execute that event. The timing information is expressed as a time difference from the execution of a previous event. For example, if the timing information is "0", an event attached with such timing information will be executed at the same time as the previous event.

Generally, a system for music reproduction according to the MIDI standards is configured to perform modeling of various signals and timbres specific to individual musical instruments and control a sound source that stores the thus obtained data with various parameters. Each track of an SMF corresponds to each musical instrument part, and includes a separated audio signal of each musical instrument part. The SMF also includes information on pitches, onset times, durations or offset times, and musical instrument labels.

If an SMF is prepared, a sample tone (hereinafter referred to as "a template tone"), which is somewhat approximate to each tone included in an input audio signal, can be generated by performing the SMF with a MIDI sound source. From the template tone, a template can be generated for data represented by a standard power spectrum corresponding to a tone generated by a particular musical instrument.

The template tone or template is not completely identical with a tone or the power spectrum of a tone included in an actual input audio signal. There is always some acoustic difference. Therefore, the intact template tone or template cannot be used as a separated tone or a power spectrum for sound separation. A sound separating system, which has been proposed by Itoyama et al. in non-patent document 2, is capable of sound separation. In the system proposed by Itoyama et al., learning or model adaptation is performed such that an update power spectrum of a tone may gradually be changed from substantially an initial power spectrum, which will be described later, to a most updated power spectrum of the tone separated from the input audio signal. Then, a plurality of parameters included in the update model parameter can finally be converged in a desirable manner. Of course, other techniques may be employed for a sound separating system.

Before describing a specific embodiment of the present invention, the following paragraphs describe a harmonic/inharmonic integrated model used to define timbral features representing timbral characteristics used herein, and also used to analyze and synthesize music audio signals (or musical instrument sounds).

[Definition of Timbral Features]

Given some actual sounds of a particular musical instrument, a synthesized sound can be obtained by synthesizing a sound of that musical instrument with arbitrary pitch and duration based on the original sounds, and a sound including a plurality of timbral characteristics. Here, what is important is to avoid distortion of the timbral characteristics. For example, if a sound having a certain pitch is generated by duration manipulation based on a musical instrument sound having a different pitch, it must be felt that these two sounds are generated by the same musical instrument.

In order to synthesize a musical instrument sound without distorting the timbral characteristics of the synthesized sound, the following three features are defined.

(i) Relative amplitudes of harmonic peaks (Harmonic peak parameters)

(ii) Inharmonic component distribution (Inharmonic component distribution parameter), and (iii) Temporal envelopes (Power envelope parameters)

In the field of acoustic psychology, it has been pointed out that auditory differences between timbres tend to be caused primarily by three factors: (i) presence of harmonic peaks in a high frequency range, (ii) inharmonic components occurring at the onset, and (iii) amplitude variation of each harmonic peak in the time domain. The above-defined three features correspond to these findings.

Figure 2:
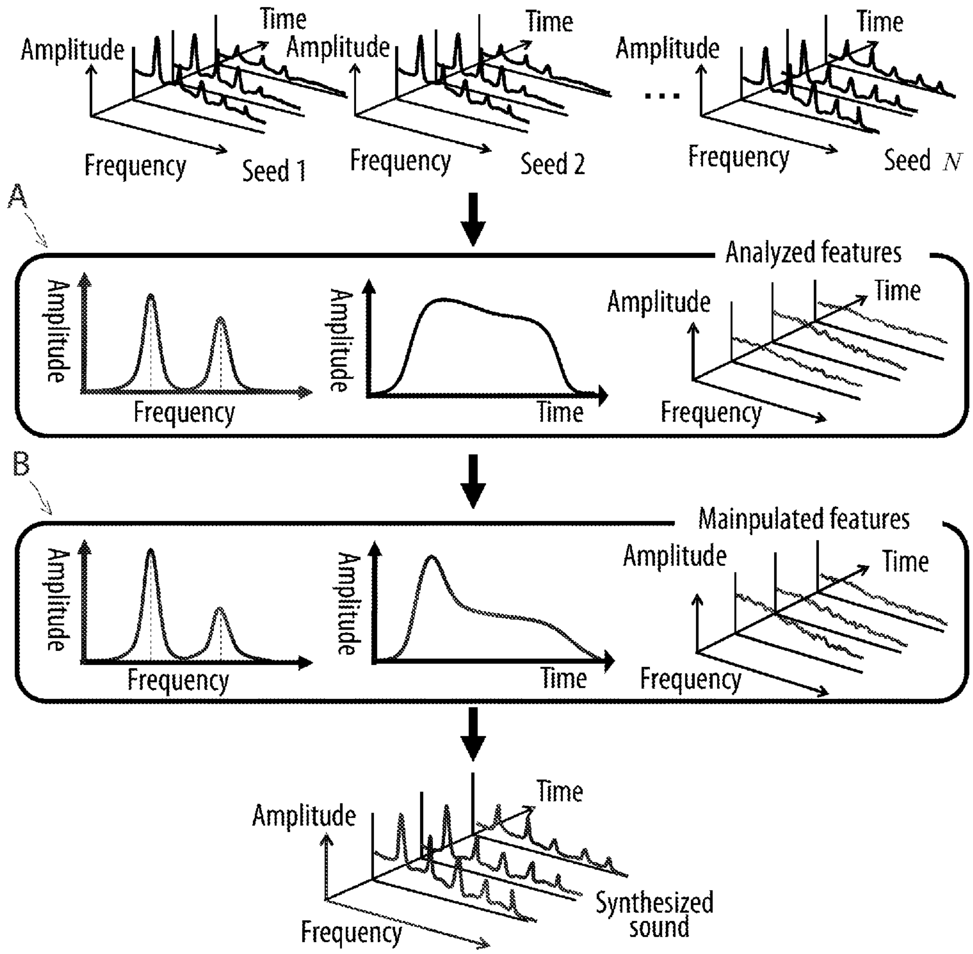
FIG. 2 is an explanatory illustration of parameter analysis for a separated audio signal and a replacement audio signal.

FIG. 2 is an explanatory illustration of parameter analysis for a separated audio signal and a replacement audio signal. Features (i) and (iii) mentioned above relate to harmonic components, and feature (ii) mentioned above relates to inharmonic components. Given a plurality of actual tones, first, each feature is analyzed after separating the harmonic and inharmonic components of each actual tone.

In this embodiment, an integrated harmonic/inharmonic model developed by Itoyama et al. and shown in non-patent document 2 is enhanced to analyze timbral features. Itoyama's integrated model as shown in non-patent document 2 may be used without enhancement. The expanded integrated model is described below.

A. Incorporation of Inharmonicity

In the harmonic structure of string instrument sounds, the tones are not exact multiples of a fundamental frequency. The frequency of each harmonic peak becomes slightly higher. This is called inharmonicity. To analyze this, a theoretical formula of inharmonicity is applied to an interval of harmonic peaks along the frequency axis.

B. Real Number Representation of Power Envelope Parameters Indicating Temporal Power Envelopes To minutely analyze the power envelope parameters for musical instrument sounds such as piano and guitar sounds having steep amplitudes, the power envelope parameters, which are represented by linear addition of Gaussian functions, are represented in real numbers.

In this embodiment, the enhanced harmonic/inharmonic integrated model is used to explicitly deal harmonic and inharmonic components. Namely, a mixture model, which is obtained by weighting a model $M^{(H)}(f,r)$ corresponding to the harmonic component by $\omega^{(H)}$ and a model $M^{(I)}(f,r)$ corresponding to the inharmonic component by $\omega^{(I)}$, is adapted to the spectrogram $M(f,r)$ of a tone as follows:

$$M(f,r)=\omega^{(H)}M^{(H)}(f,r)+\omega^{(I)}M^{(I)}(f,r) \quad \text{<Expression 1>}$$

In the above expression, f and r denote frequency and time, respectively in a power spectrum. The constraint $\Sigma_{f,r}M^{(I)}(f,r)\,dfdr=1$ is applied. Then, a weight $\omega^{(I)}$ can be considered as energy of an inharmonic component, and $\omega^{(I)}M^{(I)}(f,r)$ represents the spectrogram of an inharmonic component. $M^{(H)}(f,r)$ is expressed as a weighted mixture model which is a parametric to each of n-th harmonic peaks as follows:

$$M^{(H)}(f,r)=\sum_n F_n(f,r)E_n(r) \quad \text{〈Expression 2〉}$$

Figure 3:
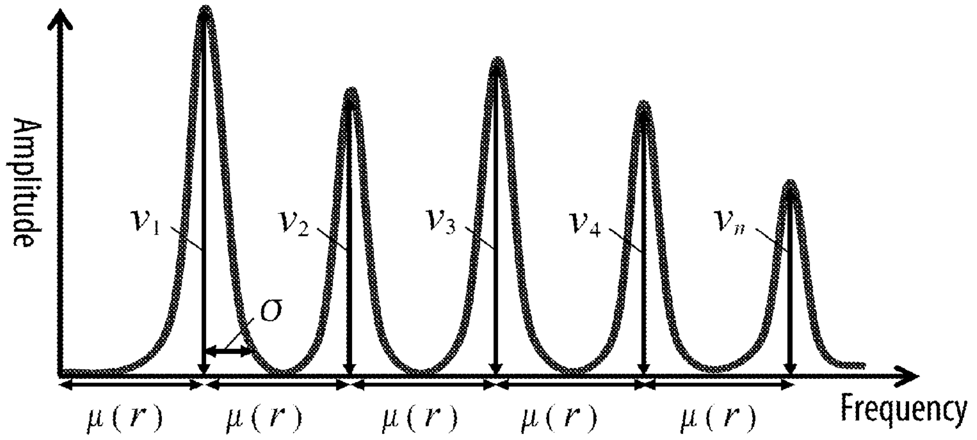
FIG. 3 illustrates an example spectral envelope including harmonic peak parameters indicating relative amplitudes of n-th order harmonic components.
Figure 4:
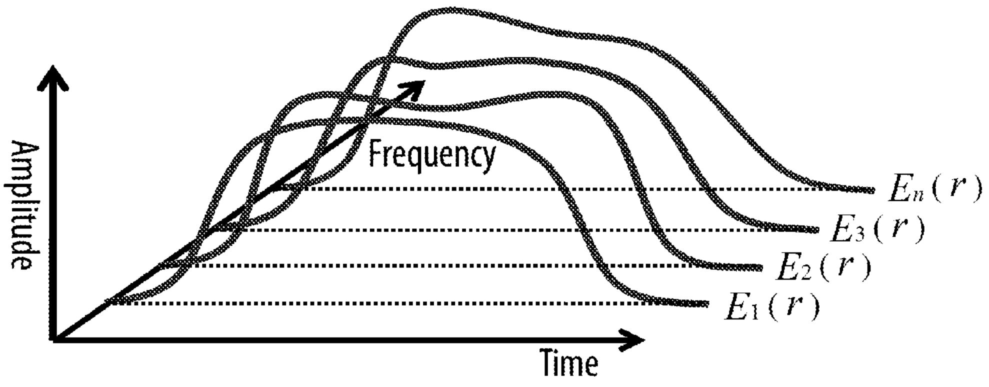
FIG. 4 illustrates example power envelope parameters (temporal envelopes) indicating temporal power envelopes of the n-th order harmonic components.

In the above expression, $F_n(f,r)$ and $E_n(r)$ respectively correspond to the spectral or frequency envelope parameters and power envelope parameters. The spectral envelope parameter includes harmonic peak parameters indicating relative amplitudes of n-th order harmonic components. The power envelope parameter indicates temporal envelopes of the n-th order harmonic components, as shown in FIGS. 3 and 4. $V_n$ corresponds to the harmonic peak parameter indicating the relative amplitudes of n-th order harmonic components. $\omega^{(I)}M^{(I)}(f,r)$ corresponds to the inharmonic component distribution parameter. $F_n(f,r)$ is expressed by multiplying a Gaussian distribution of an element of the Gaussian Mixture Model by the mixture ratio as follows:

$$F_n(f,r)=\frac{v_n}{\sqrt{2\pi\sigma^2}}\exp\left[-\frac{(f-n\mu_n(r))^2}{2\sigma^2}\right]$$ ⟨Expression 3⟩

In the above expression, σ denotes the dispersion of harmonic peaks in the frequency domain or over frequencies, and $V_n$ is a weight satisfying $\Sigma_n V_n=1$, which is the harmonic peak parameter. $\mu_n(r)$ is the frequency trajectory of the n-th order harmonic peaks, and is expressed by pitch trajectory μ(r) and inharmonicity B for incorporating inharmonicity, based on the following theoretical expression of inharmonicity.

$$\mu_n(r)=n\mu(r)\sqrt{1+Bn^2}$$ <Expression 4>

In the above expression, inharmonicity is specific to the harmonic peaks of string instrument sounds, and inharmonicity B varies depending upon the tension, stiffness, and length of the strings. Frequencies, at which harmonic peaks having inharmonicity occur, can be obtained from the above expression. Here, it is noted that μn(r)=nμ(r) when inharmonicity B is zero, and then the presence of inharmonicity can be represented by an inharmonicity parameter B. As a result, both of analyzing accuracy (or accuracy of model adaptation) and sound quality at the time of synthesis (or reproducing accuracy of analyzed sounds) can be increased by enhancing the harmonic model to represent the inharmonicity. If the expanded harmonic model capable of representing the inharmonicity is used, more accurate analysis of harmonic peaks may be performed in a separated audio signal analyzing and storing section 3 and a replacement parameter storing section 4 which will be described later. Basically, effects of the present invention may also be expected from a conventional harmonic model (in which inharmonicity B=0). Inharmonicity is pitch-dependent. When manipulating the pitches and timbres of musical instrument sounds having different pitches (separated audio signals), it is preferred that inharmonicity predicted from a pitch-dependent feature function be used in a replaced parameter creating and storing section 6 which will be described later. $E_n(r)$ represents the power envelope parameter indicating the temporal envelopes of the n-th order harmonic components, and is a function satisfying $\int E_n(r)dr=1$. In the integrated model, the timbral features (i), (ii), and (iii) respectively correspond to $V_n$, $\omega^{(I)}M^{(I)}(f,r)$, $E_n(r)$ (a parameter to be replaced). How to calculate these features will be described later in detail. The power envelope parameter is different from the amplitude envelope used in a sinusoidal model, and represents a distribution of energies of harmonic peaks in the time domain.

C. Synthesis of Musical Instrument Sounds

A sinusoidal model, which uses the features (i) and (iii) as parameters, is used to synthesize harmonic signals $S_H(t)$ corresponding to harmonic components. The overlap-add method, which uses the feature (ii) as an input, is used to synthesize inharmonic signals $S_I(t)$ corresponding to inharmonic components. The synthesized harmonic and in harmonic signals are overlapped to finally synthesize a musical instrument sound s(t) as follows:

$$s(t)=s_H(t)+s_I(t)$$ <Expression 5>

In the above expression, t denotes a sampling address of a signal.

Figure 5:
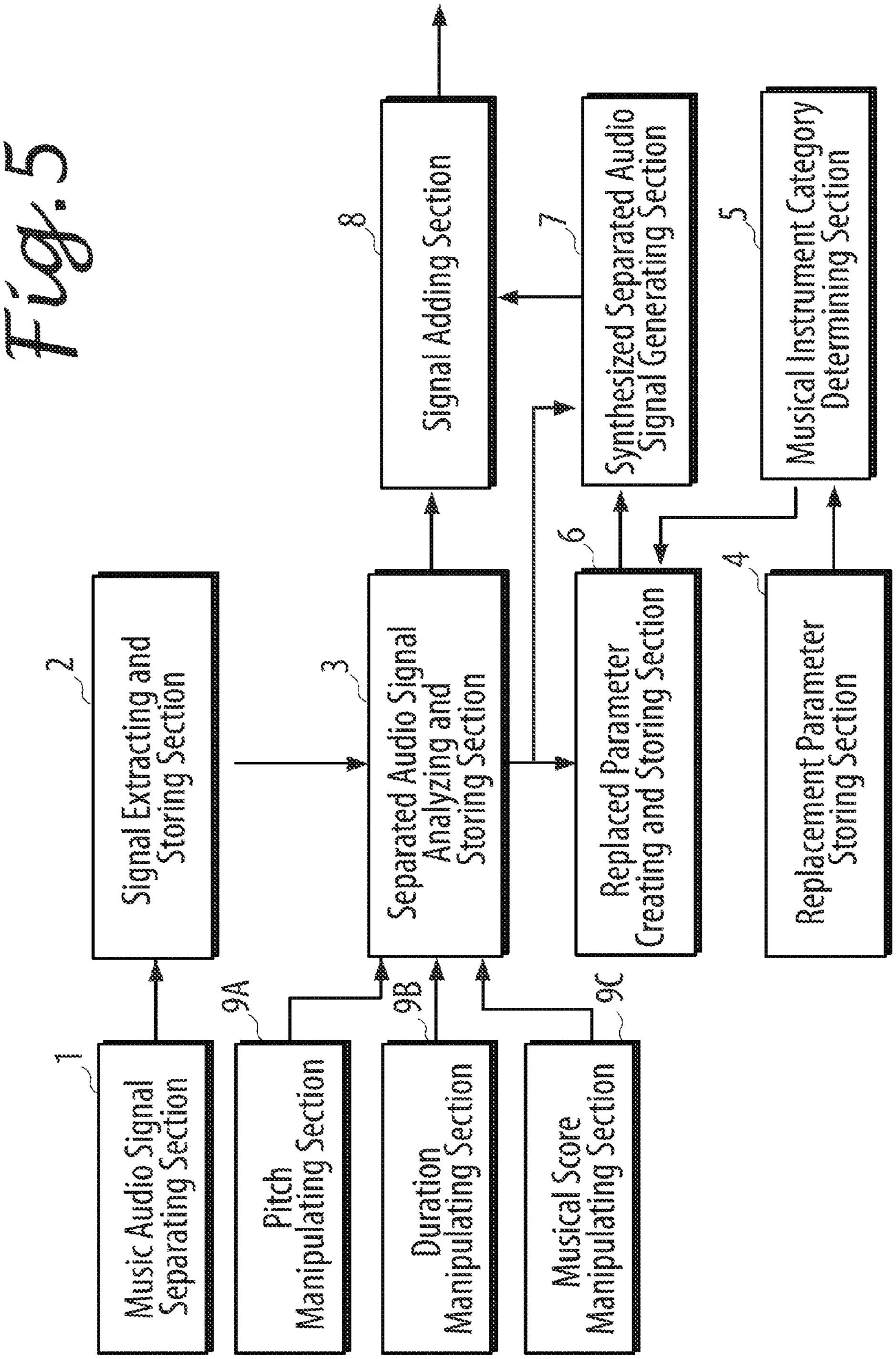
FIG. 5 is a block diagram showing an example configuration of the music audio signal generating system according to another embodiment of the present invention.

FIG. 5 is a block diagram showing an example configuration of the music audio signal generating system according to another embodiment of the present invention, wherein the above-mentioned enhanced harmonic/inharmonic integrated model is used. In this embodiment, the music audio signal generating system comprises an audio signal separating section 1, a signal extracting and storing section 2, a separated audio signal analyzing and storing section 3, replaced parameter creating and storing section 4, a musical instrument category determining section 5, a replacement parameter storing section 6, a synthesized separated audio signal generating section 7, a signal adding section 8, a pitch manipulating section 9A, and a duration manipulating section 9B.

The audio signal separating section 1 is configured to separate the music audio signal of each musical instrument part from a polyphonic audio signal using the above-mentioned enhanced integrated model. When using the harmonic/inharmonic integrated model, what is important is to estimate unknown parameters in the integrated model, that is, $\omega^{(H)}$, $\omega^{(I)}$, $F_n(f,r)$, $E_n(r)$, $V_n$, μ, (r)σ, and $M^{(I)}(f,r)$. For this purpose, Itoyama, who is an author of non-document 2 and is one of the inventors of the present application, has proposed a technique for iteratively update the parameters such that the Kullback-Leibler divergence with the spectrogram of each tone be reduced in the integrated model. The iterative updating process follows the Expectation-Maximization algorithm, and may efficiently estimate the parameters. Specifically, the model used in this embodiment is adapted to the spectrogram of each tone by minimizing the cost function J as shown below.

$$\begin{aligned}J=&\sum_n\iint\left(S_n^{(H)}(f,r)\log\frac{S_n^{(H)}(f,r)}{w^{(H)}E_n(r)F_n(f,r)}-S_n^{(H)}(f,r)+w^{(H)}E_n(r)F_n(f,r)\right)df\,dr+\\&\iint\left(S^{(I)}(f,r)\log\frac{S^{(I)}(f,r)}{w^{(I)}M^{(I)}(f,r)}-S^{(I)}(f,r)+w^{(I)}M^{(I)}(f,r)\right)df\,dr+\\&\lambda^{(v)}\left(\sum_n v_n-1\right)+\sum_n\left(\lambda^{(E_n)}\left(\int E_n(r)dr-1\right)\right)+\\&\beta^{(I)}\iint\left(M^{(I)}(f,r)\log\frac{M^{(I)}(f,r)}{\overline{M}^{(I)}(f,r)}-M^{(I)}(f,r)+\overline{M}^{(I)}(f,r)\right)df\,dr+\\&\beta^{(E)}\int\left(\overline{E}(r)\log\frac{\overline{E}(r)}{E_n(r)}\overline{E}(r)+E_n(r)\right)dr\end{aligned}$$ ⟨Expression 6⟩

In the above expression, $M^{-(I)}(f,r)$ represents an inharmonic model smoothed in the frequency direction. The inharmonic model has a very high degree of freedom, and a harmonic structure to be represented by the harmonic model will consequently be adapted excessively. In order to prevent the excessive adaptation of the inharmonic model, a distance with the smoothed inharmonic model is added to the cost function. $E^{-}(r)$ is an averaged power envelope parameter for each harmonic peak. The power of each harmonic peak is represented by the integration of vectors such as the relative amplitudes of the harmonic peaks and power envelope parameters as well as scalars such as harmonic energy. When adapting the model to weak peaks, the relative amplitudes of the harmonic peaks are almost zero (0), thereby letting the power envelope parameters have a very high degree of freedom. Later at the time of pitch manipulation, significant distortion of high harmonic components will occur when the weak relative amplitudes of the harmonic peaks become strong. In order to prevent the excessive adaptation of the power envelope parameters to the weak harmonic peaks, a distance with the averaged power envelope parameters is added to the cost function. $\Lambda(v)$ and $\Lambda(E_n)$ are Lagrange's undetermined multiplier terms respectively corresponding to $V_n$ and $E_n(r)$. $\beta^{(I)}$ and $\beta^{(E)}$ are constraint weights respectively for an inharmonic component and a power envelope parameter. $S_n^{(H)}(f,r)$ and $S_n^{(I)}(f,r)$ are respectively a peak component and an inharmonic component that are separated. The separation of the components is performed respectively by multiplication of the following partition functions, $D_n^{(H)}(f,r)$ and $D^{(I)}(f,r)$.

$$\begin{cases} S_n^{(H)}(f,r) = D_n^{(H)}(f,r)S(f,r) \\ S^{(I)}(f,r) = D^{(I)}(f,r)S(f,r) \end{cases} \quad \langle\text{Expression 7}\rangle$$

The partition function used in separation can be obtained by fixing the parameters of the model and minimizing the cost function J as follows:

$$\begin{cases} D_n^{(H)}(f,r) = \dfrac{w^{(H)}E_n(r)F_n(f,r)}{w^{(H)}M^{(H)}(f,r) + w^{(I)}M^{(I)}(f,r)} \\ D^{(I)}(f,r) = \dfrac{w^{(I)}M^{(I)}(f,r)}{w^{(H)}M^{(H)}(f,r) + w^{(I)}M^{(I)}(f,r)} \end{cases} \quad \langle\text{Expression 8}\rangle$$

The following constraint applies to the minimization in the above expression.

$$\begin{cases} \sum_n D_n^{(H)}(f,r) + D^{(I)}(f,r) = 1 \\ 0 \le D_n^{(H)}(f,r) \le 1 \\ 0 \le D^{(I)}(f,r) \le 1 \end{cases} \quad \langle\text{Expression 9}\rangle$$

In order to limit the above-mentioned degree of freedom of the inharmonic components, the partition function used in separation of inharmonic components is multiplied by a constraint weight $0 \le \gamma \le 1$ as follows:

$$\begin{cases} D_n^{(H)}(f,r) = \dfrac{w^{(H)}E_n(r)F_n(f,r)}{w^{(H)}M^{(H)}(f,r) + \gamma w^{(I)}M^{(I)}(f,r)} \\ D^{(I)}(f,r) = \dfrac{\gamma w^{(I)}M^{(I)}(f,r)}{w^{(H)}M^{(H)}(f,r) + \gamma w^{(I)}M^{(I)}(f,r)} \end{cases} \quad \langle\text{Expression 10}\rangle$$

At the initial period of iterative process, a small value is allocated to the constraint weight $\gamma$, and the constraint weight $\gamma$ is updated to be gradually close to 1. In the audio signal separating section 1, audio signals of musical instrument sounds of individual musical instrument parts are separated using the above model (this is generation of separated audio signals). At the same time, the above-mentioned parameters are estimated for each tone based on the separated audio signals. As a result, a major part of the audio signal separating section 1, the signal extracting and storing section 2, and the separated audio signal analyzing and storing section 3 is thus implemented when using the above model. If the above model is not used, the audio signal separating section 1 uses a known technique to separate music audio signals. Separation of one music audio signal is completed by estimating the parameters.

The signal extracting and storing section 2 extracts a separated audio signal from the music audio signal which has been separated by the audio signal separating section 1 and includes musical instrument sounds generated by a musical instrument of a first kind, and stores the extracted separated audio signal for each tone included in the musical instrument sounds. The signal extracting and storing section 2 also stores a residual audio signal. As described above, the separation and extraction of the separated audio signal and residual audio signal are performed. The music audio signal may be separated by the audio signal separating section 1 from a polyphonic audio signal including musical instrument sounds generated by musical instruments of a plurality of kinds as with the present embodiment. Alternatively, the music audio signal may be obtained without using the audio signal separating section 1. In this case, the music audio signal may include only the musical instrument sounds generated by a single musical instrument when that musical instrument is played. When the musical audio signal separated from the polyphonic audio signal is used as with the present embodiment, audio signals of other musical instrument parts separated by the audio signal separating section 1 are included in the residual audio signal.

The separated audio signal analyzing and storing section 3 analyzes a plurality of parameters for each of a plurality of tones included in the separated audio signal and then stores the analyzed parameters for each tone in order to represent the separated audio signal for each tone using a harmonic model that is formulated by the plurality of parameters. The plurality of parameters include at least harmonic peak parameters indicating relative amplitudes of n-th order harmonic components (generally, n harmonic peak parameters for n harmonic components of one tone) and power envelope parameters indicating temporal power envelopes of the n-th order harmonic components (generally, the same number of power envelope parameters as the harmonic peaks for one tone). When using the harmonic/inharmonic integrated model of non-patent document 2 in the audio signal separating section 1, the separated audio signal analyzing and storing section 3 is included in the audio signal separating section 1. The harmonic model is not limited to the model shown in non-patent document 2, but should be comprised of a plurality of parameters including at least harmonic peak parameters indicating relative amplitudes of n-th order harmonic components and power envelope parameters indicating temporal power envelopes of the n-th order harmonic components. As described later, if the musical instruments of the first kind are strings, accuracy of creating parameters may be increased by using a harmonic model having inharmonicity of a harmonic structure incorporated thereinto. One harmonic peak parameter may typically be represented as a real number indicating the amplitude of a harmonic peak in a power spectrum where harmonic peaks appear in the frequency direction, as shown in FIG. 3. Part A of FIG. 2 shows parameters created based on the audio signals of the musical sounds generated by the musical instrument of the first kind. One example of analyzed harmonic peak parameters indicating the relative amplitudes of n-th order harmonic components is shown on the left side of Part A of FIG. 2. A power spectrum of inharmonic components (an inharmonic component distribution parameter) is shown on the right side of Part A of FIG. 2. One example of analyzed temporal power envelope parameters of the n-th order harmonic components is shown in the center of Part A of FIG. 2. As shown in FIG. 4, the power envelope parameter may be the one which indicates temporal change of each harmonic peak power included in n harmonic peak parameters indicating the relative amplitudes of n-th order harmonic components and appearing at the same point of time. The powers of a plurality of harmonic peaks have the same frequency but appear at different points of time. An available power envelope parameter is not limited to the power envelope parameter shown in non-patent document 2.

The replacement parameter storing section 6 stores harmonic peak parameters indicating relative amplitudes of n-th order harmonic components of a plurality of tones generated by a musical instrument of a second kind. The harmonic peak parameters are created from an audio signal of musical instrument sounds generated by the musical instrument of the second kind that is different from the musical instrument of the first kind. The harmonic peak parameters thus created are required to represent, using the harmonic model, audio signals of the plurality of tones generated by the musical instrument of the second kind and corresponding to all of the tones included in the separated audio signal. If the inharmonic component distribution parameter is to be replaced, the replacement parameter storing section 6 should have a function of storing the inharmonic component parameter for the tones of the plurality of kinds included in audio signals of the musical instrument sounds generated by the musical instrument of the second kind.

Part B of FIG. 2 shows one example of harmonic peak parameters indicating relative amplitudes of n-th order harmonic components of each tone generated by the musical instrument of the second kind, the inharmonic component, one example of power envelope parameters indicating temporal power envelopes of the n-th order harmonic components. The harmonic peak parameters, inharmonic component distribution parameter, and power envelope parameters are created based on the audio signals of musical instrument sounds generated by the musical instrument of the second kind that is different from the musical instrument of the first kind. These parameters thus created are required to represent, using the harmonic model, an audio signal for each tone generated by the musical instrument of the second kind and corresponding to all of the tones included in the separated audio signal.

If the audio signals include musical instrument sounds generated by musical instruments which belong to the same category of musical instruments, the power envelope parameters take a similar shape at each frequency. The power envelope parameter for a tone shown in Part A of FIG. 2 has a shape which is specific to a trumpet or wind or non-percussive musical instrument. The shape has a pattern of change having a gradual changing portion or a steady segment between the attack and decay segments. The power envelope parameter for a tone shown in Part B of FIG. 2 has a shape which is specific to a piano or string or percussive musical instrument. The shape has a pattern of change having a steep attack segment and then decay segment. The harmonic peak parameters and power envelope parameters may be stored in an arbitrary data format. The shape of inharmonic component distribution differs depending upon the shape of a musical instrument. The inharmonic component part is a frequency component having a weak strength other than harmonic peaks forming a tone frequency. Therefore, the inharmonic component distribution parameter differs depending upon the category of musical instruments. Analysis of the inharmonic component distribution is worth considering in respect of a music audio signal including only tones generated by a single musical instrument.

The harmonic peak parameters indicating the relative amplitudes of the n-th order harmonic components of the plurality of tones generated by the musical instrument of the second kind may be created in advance, or may alternatively be prepared in the system of the present invention. It is possible to use as the musical instrument sounds generated by the musical instrument of the second kind those tones obtained from a music audio signal of other musical instrument parts separated from the polyphonic audio signal in the audio signal separating section 1.

The musical instrument category determining section 5 determines whether or not the musical instrument of the first kind and the musical instrument of the second kind belong to the same category of musical instruments. If the musical instruments belong to different categories, the power envelopes for those musical instruments have different patterns.

The replaced parameter creating and storing section 4 creates replaced harmonic peak parameters by replacing a plurality of harmonic peaks included in the harmonic peak parameters, which are stored in the separated audio signal analyzing and storing section 3 and indicate the relative amplitudes of the n-th order harmonic components of each tone generated by the musical instrument of the first kind, with harmonic peaks included in the harmonic peak parameters, which are stored in the replacement parameter storing section 6 and indicate the relative amplitudes of the n-th order harmonic components of each tone generated by the musical instrument of the second kind and corresponding to each tone generated by the musical instrument of the first kind, and then stores the replaced harmonic peak parameters thus created. In this manner, all of the harmonic peak parameters are replaced by the harmonic peak parameters obtained from the musical instrument sounds of the musical instrument of the second kind, thereby creating the replaced harmonic peak parameters. Further, the replaced parameter creating and storing section 4 also stores replaced power envelope parameters. The replaced power envelope parameters are created by replacing the power envelope parameters, which are stored in the separated audio signal analyzing and storing section 3 and indicate the temporal power envelopes of the n-th order harmonic components of each tone generated by the musical instrument of the first kind, with the power envelope parameters, which are stored in the replacement parameter storing section 6 and indicate the temporal power envelopes of the n-th order harmonic components of each tone generated by the musical instrument of the second kind and corresponding to each tone generated by the musical instrument of the first kind. If it is necessary to have the two power envelope parameters coincide with each other in terms of temporal length, the power envelopes are appropriately expanded or shrunk such that the onset and offset of the power envelope parameter for the musical instrument of the second kind may coincide with those of the power envelope parameter for the separated audio signal.

Further, the replaced parameter creating and storing section 4 creates a replaced inharmonic component distribution parameter indicating the distribution of inharmonic components of each tone by replacing the inharmonic component distribution parameter, which is stored in the separated audio signal analyzing and storing section 3, for each tone included in the musical instrument sounds generated by the musical instrument of the first kind, with the inharmonic component distribution parameter, which is stored in the replacement parameter storing section, for each tone included in the musical instrument sounds generated by the musical instrument of the second kind and corresponding to each tone generated by the musical instrument of the first kind, and then stores the replaced inharmonic component distribution parameter thus created.

The synthesized separated audio signal generating section 7 generates a synthesized separated audio signal for each tone using the parameters other than the harmonic peak parameters, which are stored in the separated audio signal analyzing and storing section, and the replaced harmonic peak parameters stored in the replaced parameter creating and storing section if the music instrument category determining section 5 determines that the musical instrument of the first kind and the musical instrument of the second kind belong to the same category. If the music instrument category determining section 5 determines that the musical instrument of the first kind and the musical instrument of the second kind belong to different categories, the synthesized separated audio signal generating section 7 uses parameters other than the harmonic peak parameters and the power envelope parameters, which are stored in the separated audio signal analyzing and storing section 3, as well as the replaced harmonic peak parameters and the replaced power envelope parameters stored in the replaced parameter creating and storing section to generate a synthesized separated audio signal for each tone. In this configuration, optimal timbral change may automatically be performed regardless of the category of musical instruments to which the musical instrument of the second kind belongs to. Then, the signal adding section 8 adds a synthesized separated audio signal output from the synthesized separated audio signal generating section 7 and a residual signal obtained from the separated audio signal analyzing and storing section 3 to output a music audio signal including the audio signal of musical instrument sounds generated by the musical instrument of the second kind. On the bottom of FIG. 2, a power spectrum before the addition of the residual audio signal is shown.

In this embodiment of the present invention, timbres can be changed or manipulated by replacing or changing parameters relating to timbres among the parameters that construct the harmonic mode, thereby readily implementing various timbral changes.

Alternatively, the musical instrument category determining section 5 need not be provided, and the replaced parameter creating and storing section 4 may store only the replaced harmonic peak parameters. In this configuration, if the pattern of change of power envelope parameters obtained from the tones generated by the musical instrument of the first kind is approximate to that of power envelope parameters obtained from the tones generated by the musical instrument of the second kind, accuracy of timbral change will be increased. In the contrary case where these two patterns of change are significantly different, the timbres are changed anyway, but changed timbres have a feel or atmosphere of the musical instrument sounds generated by the musical instrument of the first kind rather than the musical instrument of the second kind. In some cases, however, the user may prefer the timbral change of this kind.

Among the parameters to be replaced, the inharmonic component distribution parameters are not so important. Therefore, the replacement of the inharmonic component distribution parameters is not absolutely necessary if high accuracy is not required.

In this embodiment, a plurality of parameters to be analyzed by the separated audio signal analyzing and storing section 3 may include pitch parameters relating to pitches and duration parameters relating to durations. In this embodiment, a pitch manipulating section 9A configured to manipulate the pitch parameters and a duration manipulating section 9B configured to manipulate the duration parameters may additionally be provided. This configuration enables change or manipulation of pitches and durations in addition to the timbral change or manipulation.

In this embodiment, a plurality of parameters to be analyzed by the separated audio signal analyzing and storing section 3 are obtained specifically for each tone generated by the musical instrument of the first kind. Then, a musical score manipulating section 9C may be provided to create pitch parameters relating to pitches, duration parameters relating to durations, and timbre parameters relating to timbres that are suitable for each tone in a musical score of an arbitrary structure specified by the user. The timbre parameter is one of the parameters constructing the harmonic model. In this embodiment wherein the music score manipulating section 9C is additionally provided, musical score change or manipulation is also enabled in addition to the timbral change.

Next, techniques for manipulating pitches, durations, timbres and musical scores will be described below. Japanese Industrial Standards (JIS) define the term "timbre" as "an auditory characteristic of a tone or sound. A characteristic associated with a difference between two tones when the two tones give different impressions although the two tones have an equal loudness and an equal pitch." In this definition, the timbre is considered as being an independent characteristics from the pitch and volume (or loudness) of the tone. It is known, however, that the timbre is dependent upon the pitch, in other words, the timbre is a pitch-dependent characteristic. If the pitch is manipulated while holding or preserving the features which would otherwise be changed due to the manipulated pitch, timbral distortion will occur in the manipulated musical instrument sounds. A spectral envelope is known as a physical quantity associated with the timbre. It is not possible, however, to exactly represent the relative amplitudes of harmonic peaks of tones having different pitches by using only one spectral envelope. The timbral characteristics cannot be represented only with such timbral features. Then, the inventors of the present application assumed that the timbral characteristics cannot be understood without analyzing the timbral features and their mutual dependencies. On this assumption, the inventors attempted to deal with the timbres specific to individual musical instruments by analyzing not only the timbral features but also the pitch-dependencies of timbral features for a plurality of musical instruments. In short, manipulations of pitches, durations, timbres, and musical scores are performed with the pitch-dependency of timbral features taken into consideration. Then, harmonic and inharmonic components are separately synthesized and synthesized harmonic and inharmonic components are finally added.

The inventors focused on the known academic paper which takes account of the pitch-dependency: T. Kitahara, M. Goto, and N. G. Okuno, "Musical instrument identification based on f0-dependent multivariate normal distribution", IEEE, Col, 44, No. 10, pp. 2448-2458 (2003). It is reported in this academic paper that performance of identifying musical instrument sounds was improved by learning the distribution of the acoustic features after removing the pitch dependency of timbres by approximating the distribution of acoustic features over pitches using a regression function (called pitch-dependent feature function). This paper simply discloses that a regression function is used in pitch manipulation, but does not describe that that function is used in timbral replacement and that learning parameters are generated by an interpolation method.

Pitch manipulation is achieved by multiplying a pitch trajectory $\mu(r)$ by a desired ratio. In manipulating pitches, it is not possible to hold or preserve the values of the timbral features or use the values of the timbral features for the timbres without changing them. This is because the timbres are known to have pitch-dependency. The larger the ratio of pitch manipulation, the larger the distortion of timbral features.

Figure 6:
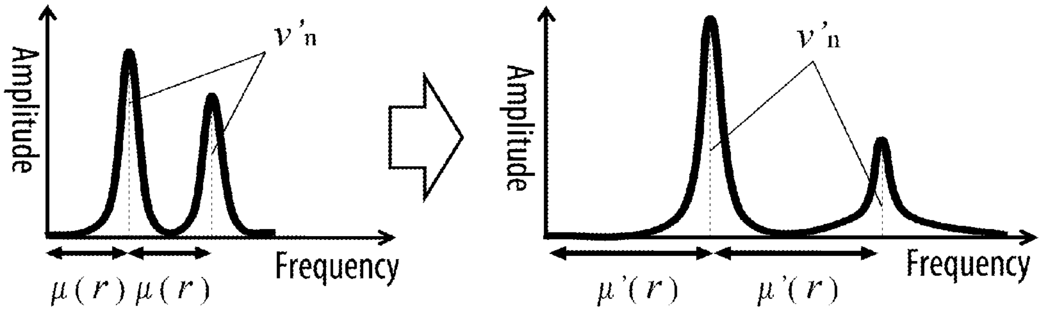
FIG. 6 illustrates manipulation of a spectral envelope.
Figure 7A:
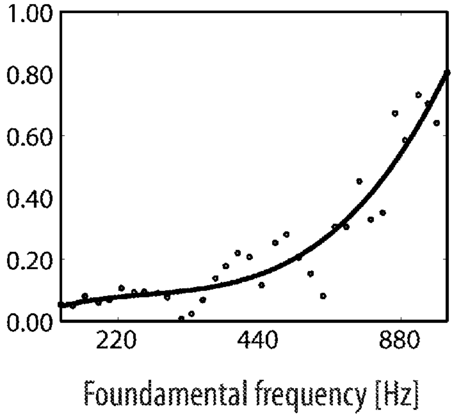
FIGS. 7A to 7D illustrate relative amplitudes of the first-order, fourth-order, and tenth-order overtones of a trumpet as well as a pitch-dependent feature function for energy ratio of harmonic and inharmonic components.
Figure 7B:
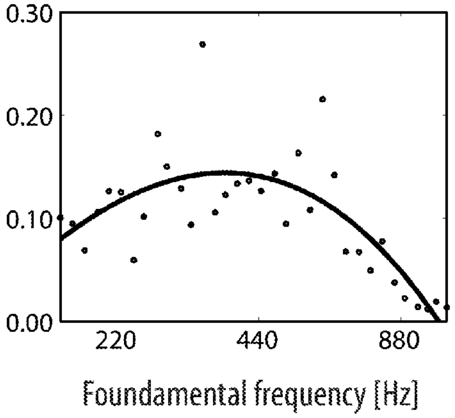
Figure 7C:
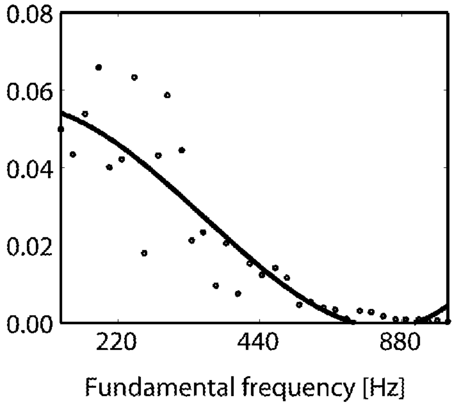
Figure 7D:
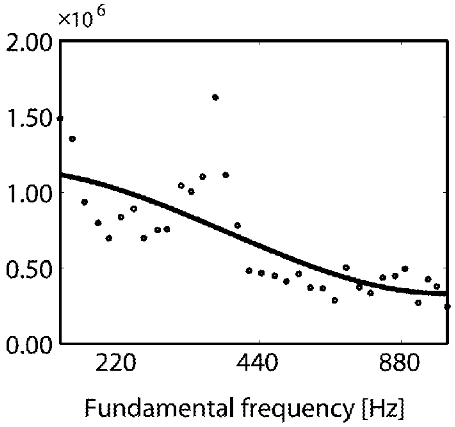

As shown in FIG. 6, when shifting the pitch from $\mu(r)$ to $\mu'(r)$, it is necessary to properly shift the relative amplitude from $V_n$ to $V_n'$.

To solve this problem, the inventors focused on a method of identifying musical instrument sounds with the pitch-dependency taken into consideration as proposed by T. Kitahara, M. Goto, and H. G. Okuno in their academic paper titled "Musical instrument identification based on f0-dependent multivariate normal distribution", IEEE, Col, 44, No. 10, pp. 2448-2458 (2003). It is reported in this academic paper that performance of identifying musical instrument sounds was improved by learning the distribution of the acoustic features after removing the pitch dependency of timbres by approximating the distribution of acoustic features over pitches using a cubic polynomial.

The following reasons for pitch-dependency of the timbers are known.

1. The lower the pitch, the larger the sound board or body of a musical instrument. The larger the sound board or body of a musical instrument, the larger the inertia. Then, it takes longer time for the power envelope to rise (or attack) and to decline (or decay).

2. The larger the pitch, the larger the vibration loss. Therefore, high order harmonic waves are hard to occur.

3. In some musical instruments, the sound boards or bodies of the musical instruments differ depending upon the pitches and the sound boards or bodies are made of different materials.

It follows from the foregoing findings that the timbres of a musical instrument continuously changes from a low frequency to a high frequency. In this embodiment, except the feature (iii) power envelope which is considered to depend upon articulation style rather than upon pitch, the features over pitches, (i) relative amplitudes of harmonic peaks (harmonic peak parameters) and (ii) distribution inharmonic components (inharmonic component distribution parameters) are approximated as an n-th function (called pitch-dependent feature function).

Specifically, a cubic polynomial is used as an n-th pitch-dependent feature function in this embodiment. The third order was determined based on the inventor's established criteria that the third order would be sufficient to learn pitch-dependency of timbres from limited learning data and deal with changes in timbral features due to pitches, and also based on a conducted preliminary experiment.

Specifically, the inventors focused on the following two parameters:

(1) Relative amplitudes $V_n$ of harmonic peaks, and (2) Ratio $\omega^{(H)}/\omega^{(I)}$ of harmonic energy to inharmonic energy. In respect of the relative amplitudes $V_n$, a pitch-dependent feature function is created independently for each n-th order. This causes the constraint $\Sigma_n V_n=1$ for $V_n$ to not always be satisfied. Even in this case, however, the values of $\Sigma_n V_n$ for most of the pitches fall within a range of about 0.9 to 1.1. This will not cause the timbres of generated musical instrument sounds to significantly change. Given that a plurality of tones (called seed) have different pitches, the timbral features of these tones can be analyzed to obtain a pitch-dependent feature function by the least squares method. Using the thus obtained pitch-dependent feature function, the timbral features may be predicted for a desired pitch. For example, FIGS. 7A to 7D illustrate the relative amplitudes of the first-order, fourth-order, and tenth-order harmonic peaks as well as the pitch-dependent feature function for the ratio of harmonic energy to inharmonic energy of trumpet sounds. In FIGS. 7A to 7D, dots denote the timbral features analyzed for each tone, and solid lines denote the pitch-dependent feature functions derived therefrom.

In manipulating durations, it is not appropriate to expand or shrink the power envelope parameter $E_n(r)$ to a desired duration. It is known that the attack and decay segments and the period of pitch changes are similar in respect of musical instruments which belong to the same category of musical instruments. The larger the ratio of duration manipulation, the larger the amount of distortion. Particularly in the attack and decay segments of musical instrument sounds, the energy largely changes, thereby deeply relating to timbral impressions. Especially, for musical instruments that are often played using vibrato articulation, the pitch trajectory is important, thereby significantly affecting auditory impressions.

Figure 8:
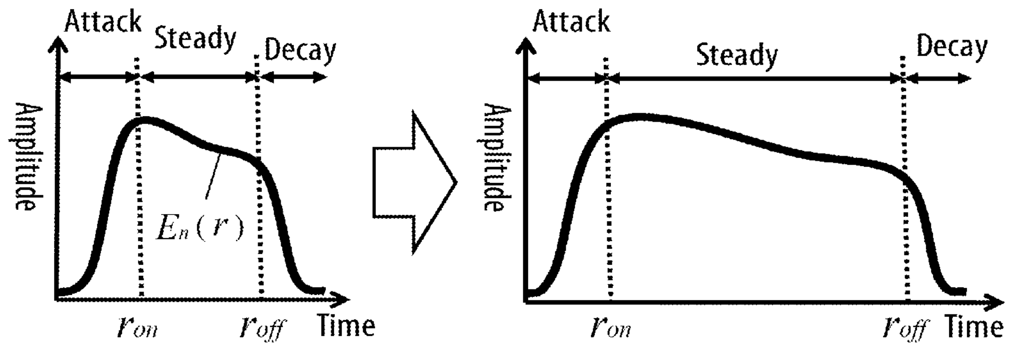
FIG. 8 is an explanatory illustration of temporal envelope manipulation.
Figure 9:
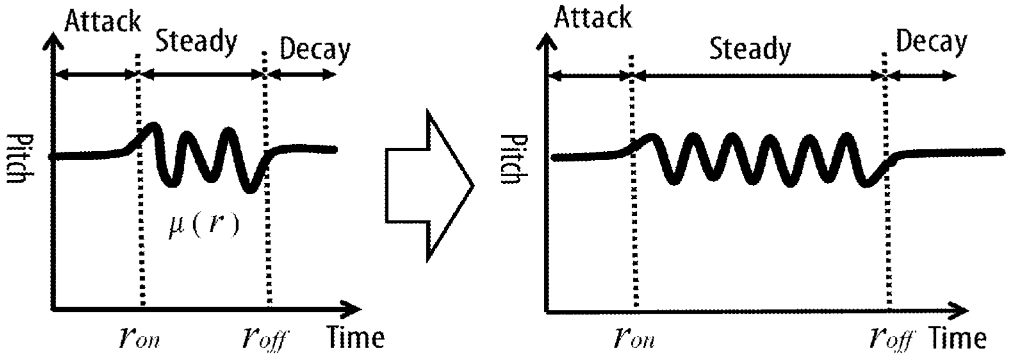
FIG. 9 is an explanatory illustration of pitch trajectory manipulation.

To solve this problem, the inventors have employed a method of preserving the temporal power envelope in the attack and decay segments and a method of reproducing the temporal changes of the pitch trajectory. First, in feature (iii), the end of sharp emission of energy is defined as onset $r_{on}$, and the start of sharp decline in energy as offset $r_{off}$. As shown in FIG. 8, only the temporal envelope between the onset and offset are expanded or shrunk to manipulate the duration. As shown in FIG. 9, a sinusoidal model is used to represent the pitch trajectory between the onset and offset and generate the pitch trajectory of a desired length that has the same spectral characteristic as the one before the duration manipulation. The pitch trajectories before the onset and after the offset are the same as those for the seed. Gaussian smoothing is applied to the pitch trajectory in the vicinity of the onset and offset.

Next, how to change a musical score will be described below. In this embodiment, in changing a musical score, the pitch trajectory, power envelope parameter, and timbral features are prepared for each tone included in a changed musical score. If the changed musical score is essentially different from the original musical score, it is not appropriate to obtain the necessary features through the pitch and duration manipulations mentioned above. This is because the pitch trajectory, power envelope, and timbral features, which have been obtained by analyzing an actual performance of musical instruments, include fluctuating features which occur depending upon the musical score structure, that is, performance with expressions. Therefore, it is desirable to newly generate features for the changed musical score based on the features obtained from the performance of the original musical score on an assumption "musical scores having a similar structure are played with similar tones".

Figure 20:
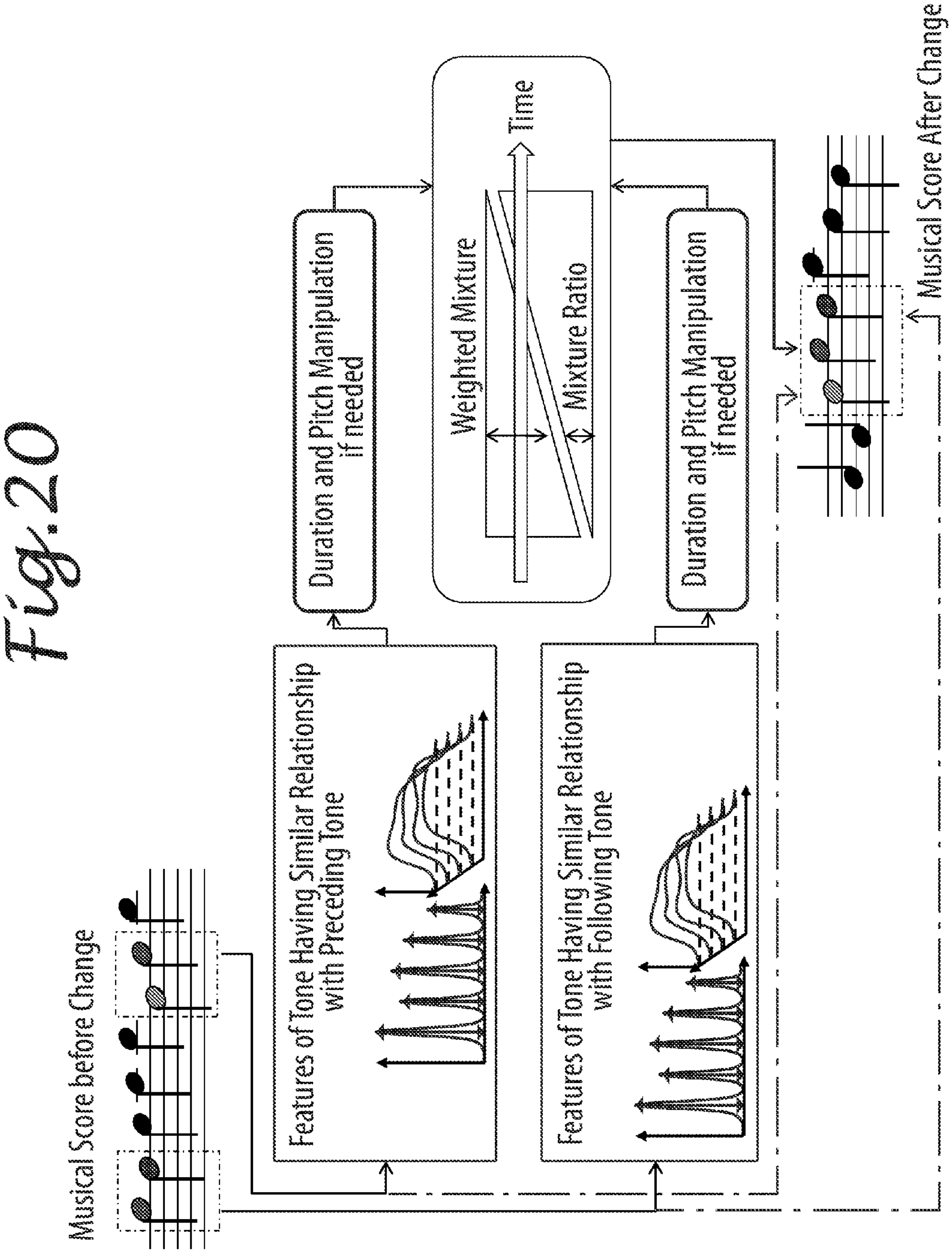
FIG. 20 is a schematic explanatory illustration for musical score manipulation.

As schematically shown in FIG. 20, the inventors obtain the features for all of the tones included in the changed musical score by analyzing two tones including a particular tone as follows:

1) A particular tone included in the original musical score having the most similar four factors, the pitch of a preceding tone, the duration of the preceding tone, the pitch of the particular tone, and the duration of the particular tone; and 2) A particular tone included in the original musical score having the most similar four factors, the pitch of the particular tone, the duration of the particular tone, the pitch of a following tone, and the duration of a following tone. Then, the features thus obtained are temporally changed at a mixing ratio from 1:0 to 0:1 to mix the two tones with a weight applied. This manipulation sequentially couples smoothly a pair of adjacent tones in the original musical score in accordance with the changed musical score.

Next, timbral manipulation or change will be described below. The timbral manipulation is achieved by multiplying each timbral feature by a mixing ratio expressed in a real number. The timbral features are interpolated in one of two manners described below.

Linear Mixture $$Feature^{(P)} = \sum_{k} \alpha_k Feature^{(k)} \quad \langle\text{Expression 11}\rangle$$

Logarithmic Mixture $$Feature^{(P)} = \exp\left[\sum_{k} \alpha_k \log(Feature^{(k)})\right] \quad \langle\text{Expression 12}\rangle$$

Feature typically includes timbral features, $V_n$, $M^{(I)}(f,r)$ and $E_n(r)$. k and p are indexes to each tone and to an interpolated feature, respectively. The mixing ratio αk for each tone satisfies the constraint Σkαk=1. When 0<αk<1, interpolation applies, and when 1<αk or αk<0, extrapolation applies. The ratio of change in interpolated or extrapolated features is constant in the linear mixture, but the linear mixture does not take account of human auditory characteristics of logarithmically understanding the sound energy. In contrast therewith, the logarithmic mixture takes human auditory characteristics into consideration. However, attention should be paid to extrapolation since the mixed features are finally converted into exponents.

Figure 10A:
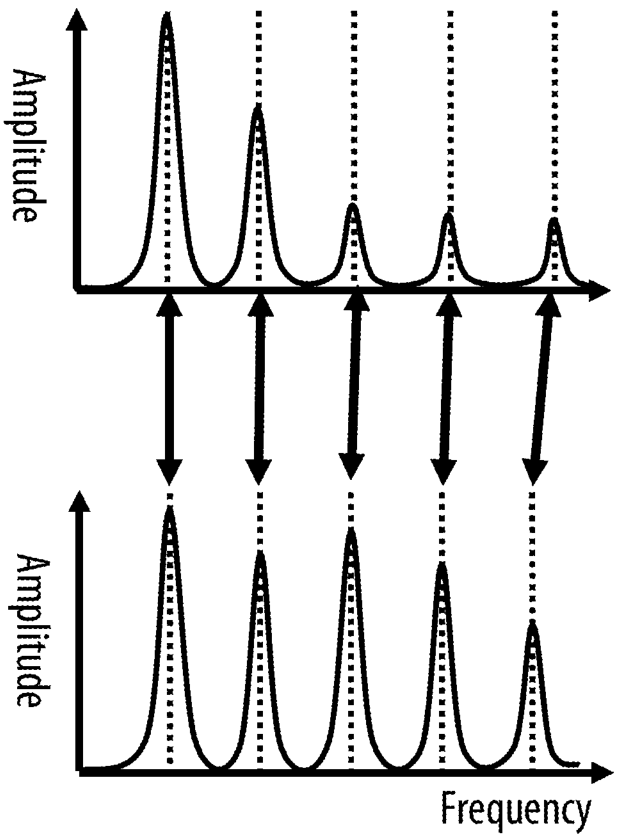
FIGS. 10A to 10C illustrate examples of relative amplitudes of harmonic peaks, temporal power envelope parameters, and inharmonic component distributions.
Figure 10B:
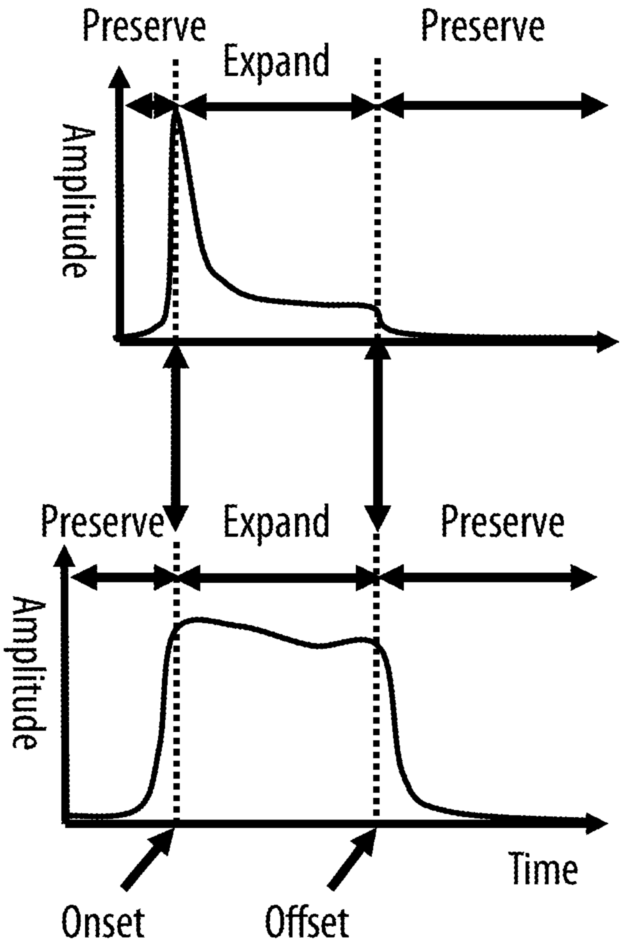
Figure 10C:
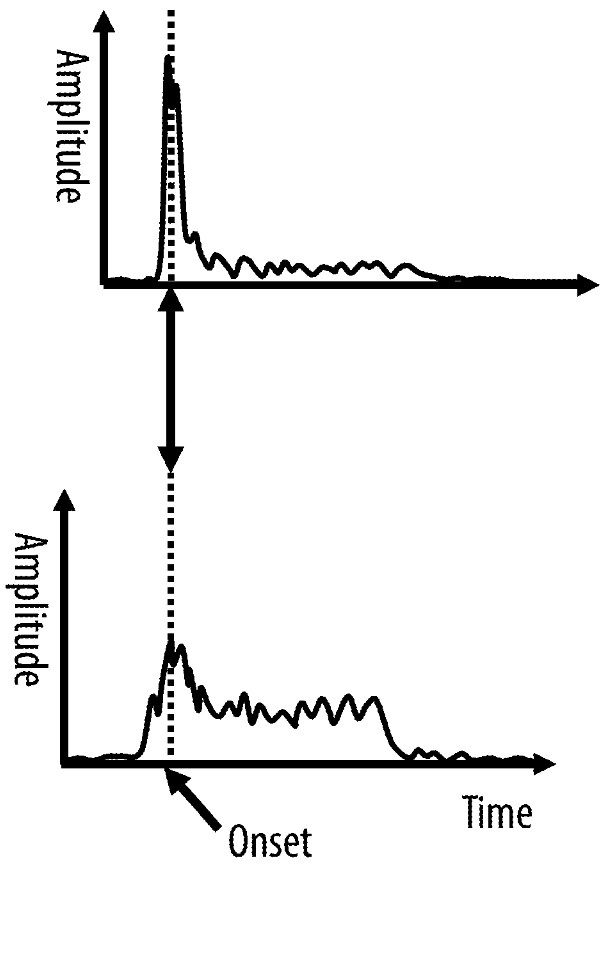

Alignments of timbral features are illustrated in FIGS. 10A to 10C. FIG. 10A illustrates an example replacement of harmonic peaks, where the upper row shows a plurality of harmonic peaks included in the harmonic peak parameters indicating the relative amplitudes of n-th harmonic components for each tone generated by the musical instrument of the first kind; and the lower row shows a plurality of harmonic peaks included in the harmonic peak parameters indicating the relative amplitudes of the n-th harmonic components for each tone generated by the musical instrument of the second kind and corresponding to each tone generated by the musical instrument of the first kind. FIG. 10B illustrates an example alignment between the power envelope parameter obtained from the tones generated by the musical instrument of the first kind and the power envelope parameter obtained from the tones generated by the musical instrument of the second kind. The power envelopes are expanded or shrunk such that the onset and offset of the power envelope parameter for the musical instrument of the first kind and those of the power envelope for the musical instrument of the second kind should be aligned. FIG. 10C illustrates an example alignment between the inharmonic components for each tone generated by the musical instrument of the first kind shown in the upper row and the inharmonic components for each tone generated by the musical instrument of the second kind shown in the lower row. The onsets of both inharmonic components shown in the upper and lower rows should be aligned.

Figure 11:
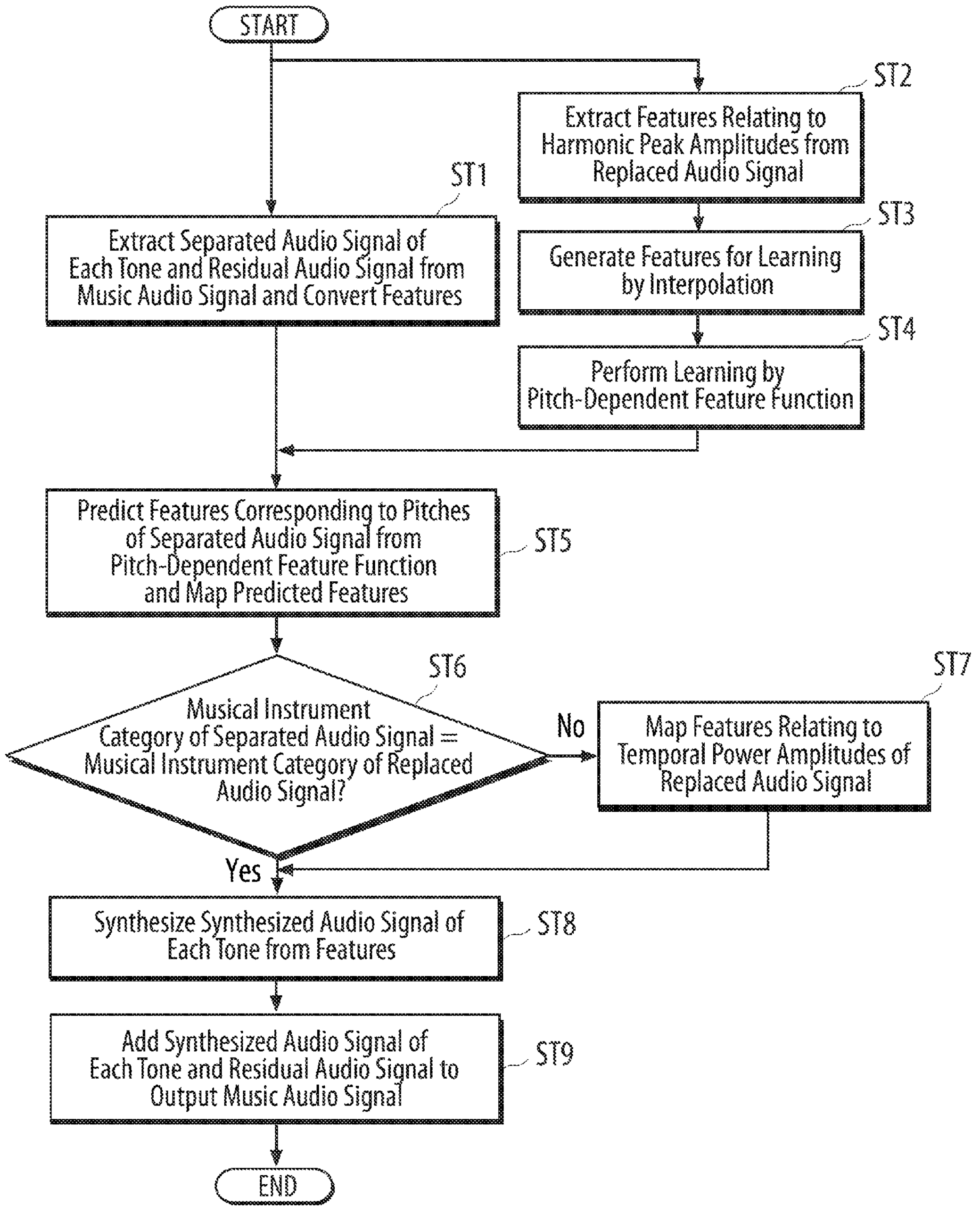
FIG. 11 is a flowchart describing an example algorithm of computer program installed in a computer to implement the music audio signal generating system of FIG. 5.
Figure 13:
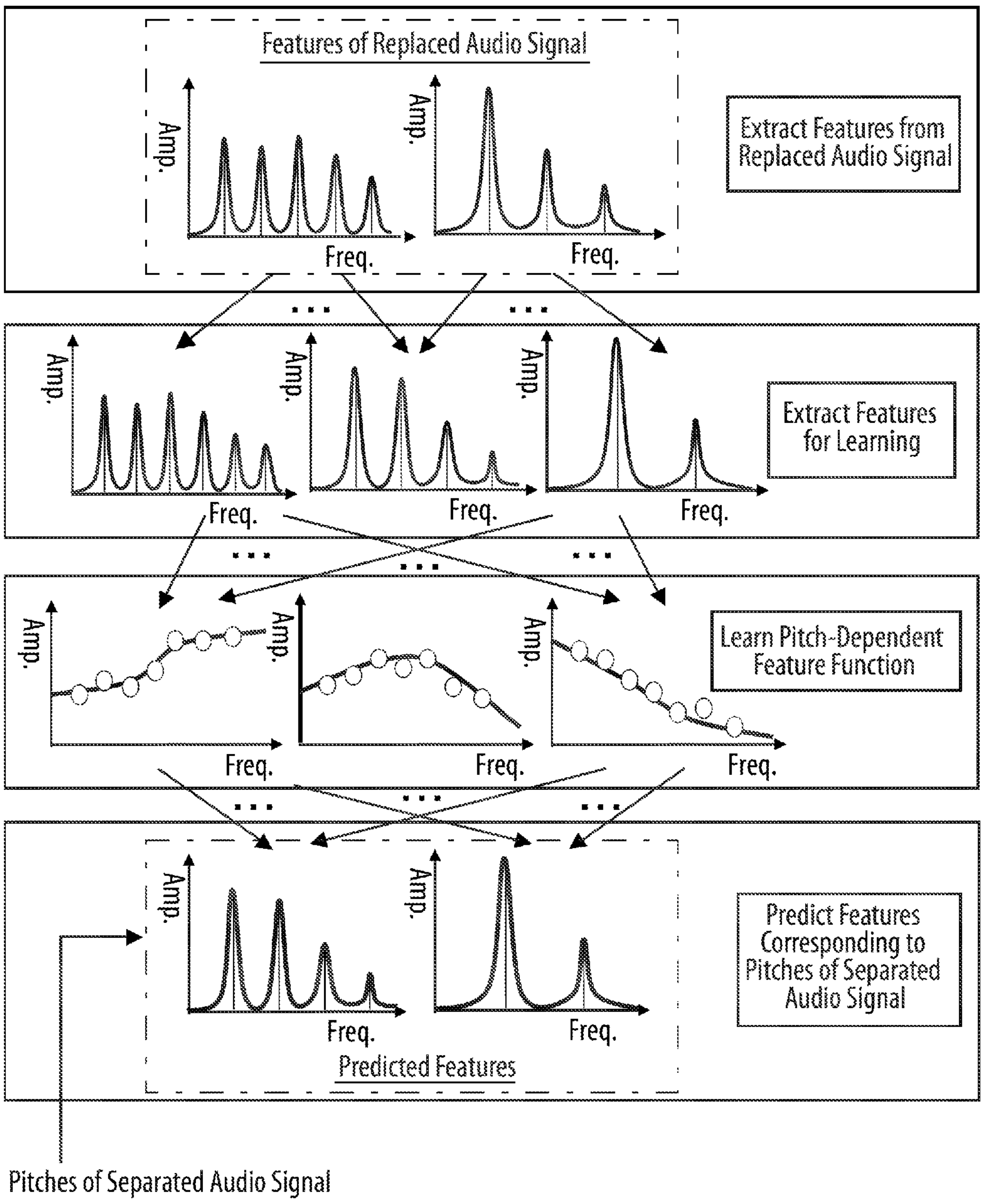
FIG. 13 is an explanatory illustration for displaced parameter creation using a pitch-dependent feature function.

FIG. 11 is a flowchart showing an example algorithm of a computer program installed in a computer to implement the music audio signal generating system of FIG. 5. FIG. 13 is an explanatory illustration for timbral manipulation. In this computer program, timbral change or manipulation is performed through the replacement of the harmonic peak parameters indicating the relative amplitudes of n-th harmonic components for a plurality of tones and the power envelope parameters. First in step ST1, a separated audio signal for each tone and a residual audio signal are extracted from a music audio signal including the audio signal of musical instrument sounds generated by the musical instrument of the first kind. In step ST1, a plurality of parameters are analyzed in order to represent the separated audio signal for each tone using a harmonic model that is formulated by the plurality of parameters including at least harmonic peak parameters indicating relative amplitudes of the n-th harmonic components and power envelope parameters indicating temporal envelopes of the n-th harmonic components. This process is feature conversion.

In steps ST2 through ST4, features relating to relative amplitudes of harmonic peaks and power envelopes from audio signals (or replaced audio signals) of musical instrument sounds generated by the musical instrument of second kind that is different from the musical instrument of the first kind. In steps ST2 to ST4, a replacement parameter storing section 6 is comprised of elements shown in FIG. 12. The replacement parameter storing section 6 as shown in FIG. 6 includes a parameter analyzing and storing section 61, a parameter interpolation creating and storing section 62, and a function generating and storing section 63. The parameter analyzing and storing section 61 is a function implementing means to be implemented in step ST2. The parameter analyzing and storing section 61 analyzes and stores at least harmonic peak parameters and power envelope parameters for tones of a plurality of kinds that are obtained from an audio signal of musical instrument sounds generated by the musical instrument of the second kind. The harmonic peak parameters indicate relative amplitudes of n-th order harmonic components for each tone. The power envelope parameters indicate temporal power envelopes of the n-th order harmonic components for each of tones of the plurality of kinds. The harmonic peak parameters and power envelope parameters are required to represent a separated audio signal for each tone using the harmonic model. The parameter analyzing and storing section 61 may store the power envelope parameters indicating temporal power envelopes of the n-th order harmonic components, which are obtained by analysis, as representative power envelope parameters.

The upper part of FIG. 13 illustrates power spectra of two harmonic peak parameters among the harmonic peak parameters indicating the relative amplitudes of n-th order harmonic components of one tone as the features of a replaced audio signal. The parameter interpolation creating and storing section 62 is a function implementing means to be implemented in step ST3. In step ST3, features for learning are generated by interpolation. Specifically, the parameter interpolation creating and storing section 62 create the harmonic peak parameters and the power envelope parameters by an interpolation method for tones other than the tones of the plurality of kinds among the tones generated by the musical instrument of the second kind and corresponding to all of the tones included in the separated audio signal, based on the harmonic peak parameters and the power envelope parameters, which are stored in the parameter analyzing and storing section 61, for each of the tones of the plurality of kinds. The harmonic peak parameters and the power envelope parameters are required to represent, using the harmonic model, an audio signal of the tones other than the tones of the plurality of kinds. Then, the parameter interpolation creating and storing section 62 stores the harmonic peak parameters and the power envelope parameters thus created. In step 3, for example, if there are only two tones, other necessary tones are created by interpolation method and then stored.

In steps ST2 through ST4, the harmonic peak parameters, power envelope parameters, and inharmonic component distribution parameters are extracted from an audio signal (or replaced audio signal) of musical instrument sounds generated by the musical instrument of the second kind that is different from the musical instrument of the first kind. Then, replacement parameters for those parameters are created by interpolation method. Thus, a limited number of replacement audio signals are enough to replace the audio signals of musical instrument sounds generated by the musical instrument of the second kind wherein each of the tones has the same pitch and duration as each tone included in a music audio signal for which timbral replacement is desired. Timbres have pitch-dependency. It is known from the experiments described in non-patent document 4 that the harmonic peak parameters have particularly strong pitch-dependency.

In contrast with the harmonic peak parameters, the spectral envelope has little pitch-dependency. Non-patent document 5 reports a high-quality pitch manipulation of voices by holding or preserving the spectral envelopes.

The pitch manipulation technique which holds the spectral envelopes is one of the techniques to be evaluated in the experiments described in non-patent document 4. The experiment results indicate that the spectral envelopes have little pitch-dependency. In acoustic psychology, it is pointed out that temporal changes of timbres tend to be perceived by human auditory sense through variations in amplitude of each harmonic peak in the time domain and inharmonic components occurring at the time of sound generation. For auditory perception of timbres, the power envelope parameters include important features at the time of sound generation and sustaining, and the inharmonic component distribution parameters include important features at the time of sound generation.

Figure 14:
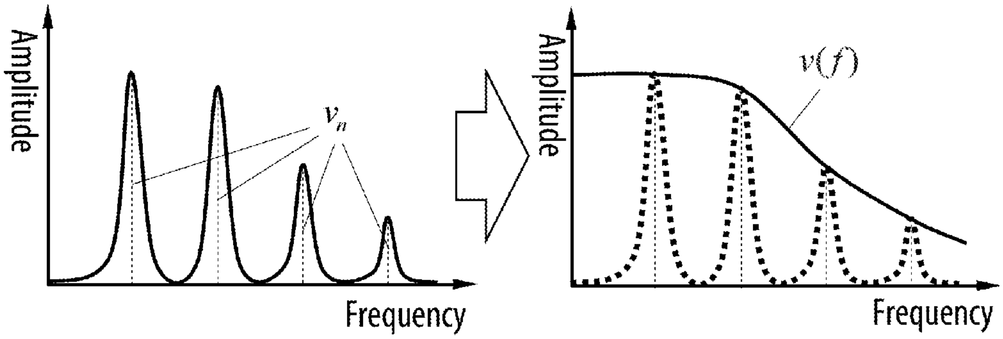
FIG. 14 is an explanatory illustration for determination of a spectral envelope from the relative amplitudes of harmonic peaks.

In the interpolation of harmonic peak parameters in this embodiment, a focus is placed on the smaller pitch-dependency of spectral envelopes than harmonic peak parameters, and the harmonic peak parameters are converted into spectral envelopes. As shown in FIG. 14, the conversion of harmonic peak parameters into spectral envelopes v(f) is achieved by interpolating each of the adjacent harmonic peak parameters $v_n$ by linear interpolation, spline interpolation, etc. The harmonic peak parameter of a frequency which is most approximate to that of the desirable sound is used in the conversion of a spectral envelope having a frequency that exceeds the interpolation segment, that is, a frequency lower than the pitch and higher than the frequency of the highest order harmonic peak. Likewise, the value of the most neighboring parameter is used in the interpolation of segments exceeding the interpolation segment.

The spectral envelope v(f) thus obtained is interpolated by using the following expression, thereby creating an interpolated spectral envelope for each tone having an arbitrary pitch μ in the music audio signal for which timbral replacement is desired.

$$\hat{v}(f)=\exp[(1-\alpha)\log(\overline{v}^{(k)}(f))+\alpha\log(\overline{v}^{(k+1)}(f))]$$ <Expression 13>

In the above expression, k is an index allocated to a replaced audio signal; v(k)(f) and v(k+1)(f) denote spectral envelopes of replaced audio signals having the most neighboring pitch in low-frequency and high-frequency ranges, respectively; α denotes an interpolation ratio determined based on the pitches μ(k) and μ(k+1) of the replaced audio signal and calculated as follows:

⟨Expression 14⟩

$$\alpha=\frac{\hat{\mu}-\mu^{(k)}}{\mu^{(k+1)}-\mu^{(k)}}$$

The pitch μn is defined as follows:

$$\mu_n=n\mu\sqrt{1+Bn^2}$$ <Expression 15>

Finally, an interpolated harmonic peak parameter is obtained from the interpolated spectral envelope of the harmonic peak frequency as follows:

$$\hat{v}_n=\hat{v}(\hat{\mu}_n)$$ <Expression 16>

Figure 15:
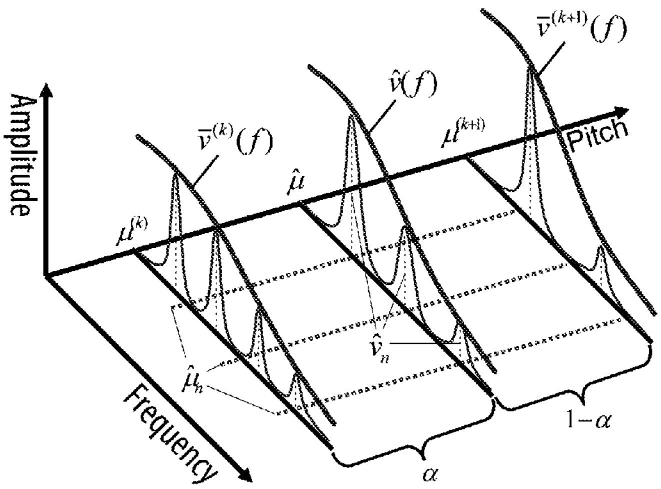
FIG. 15 is an explanatory illustration of expressions used for generating learning features by an interpolation method.

FIG. 15 schematically illustrates the interpolation of harmonic peak parameters mentioned above.

Figure 16:
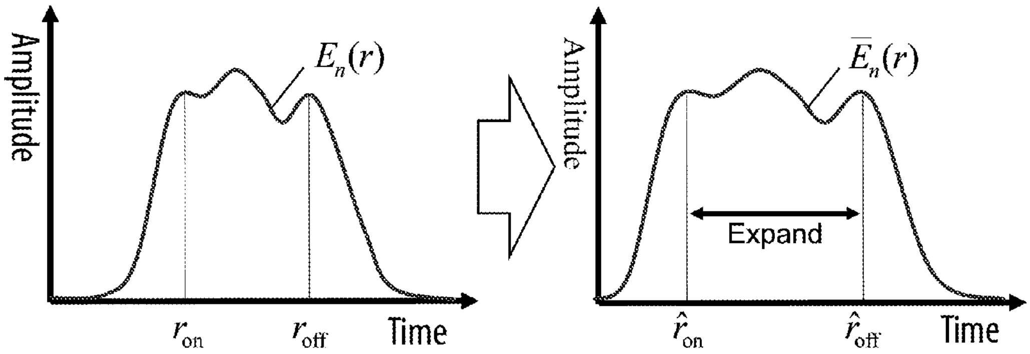
FIG. 16 is an explanatory illustration for obtaining a synthesized power envelope parameter EN(r).

In the interpolation of power envelope parameters in this embodiment, a focus is placed on auditory perception of timbres at the amplitude of each harmonic peak at the time of sound generation and sustaining. Then, the onset and offset of a tone in the replaced audio signal are synchronized with the onset and offset of a tone in the music audio signal for which timbral replacement is desired. The onset $r_{on}$ thus synchronized is the point at which a power sufficiently becomes large in an average power envelope parameter, and the offset $r_{off}$ thus synchronized is the point at which the power sharply declines. Techniques for detection of the onset and offset are arbitrary. For synchronization with the onset and offset of a tone in music audio signal for which timbral replacement is desired, it is necessary to manipulate the power envelope parameters in the time domain. For this purpose, a technique reported in non-document 6 is employed. As shown in FIG. 16, only the segment between the onset and offset ($r_{on}-r_{off}$) is manipulated to obtain a synchronized power envelope parameter $E_n(r)$.

The interpolated power envelope parameter $E_n(r)$ for a tone having an arbitrary duration in the music audio signal, for which timbral replacement is desired, is obtained by interpolating the synchronized power envelope parameter using the following expression.

$$\hat{E}_n(r)=\exp[(1-\alpha)\log(\overline{E}_n{}^{(k+1)}(r))+\alpha\log(\overline{E}_n{}^{(k)}(r))]$$ <Expression 17>

Figure 17:
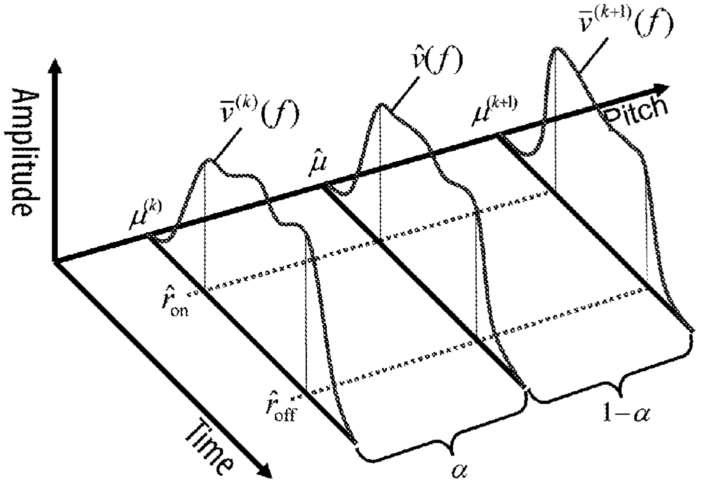
FIG. 17 schematically illustrates interpolation of power envelope parameters.

In the above expression, $E(k)_n(f)$ and $E(k+1)_n(f)$ denote power envelope parameters of a replaced audio signal having the most neighboring pitches in the low-frequency and high-frequency ranges, respectively. The interpolation ratio used for harmonic peak parameters is also used for power envelope parameters. FIG. 17 schematically illustrates the interpolation of power envelope parameters mentioned above.

Figure 18:
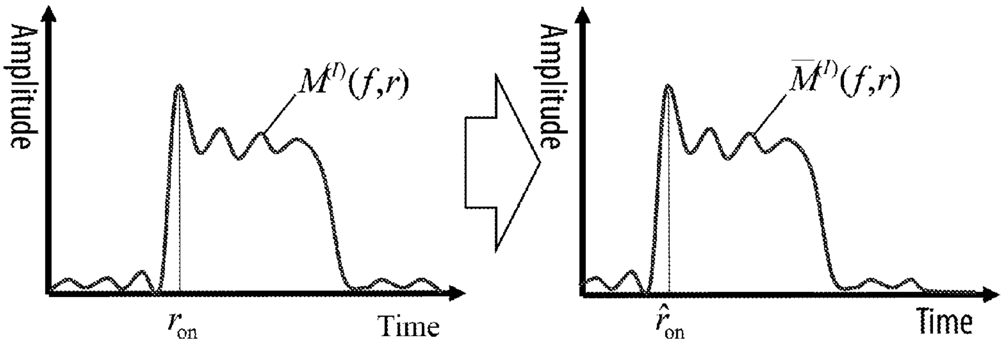
FIG. 18 illustrates that synchronization occurs at the onset of each tone in a music audio signal.

In the interpolation of inharmonic component distribution parameters in this embodiment, a focus is placed on auditory perception of timbres of inharmonic components at the time of sound generation. Then, the onset of a tone in the replaced audio signal is synchronized with the onset of a tone in the music audio signal for which timbral replacement is desired. The onset $r_{on}$ thus synchronized is the same as the one used in the synchronization of the power envelope parameters. For synchronization with the onset $r_{on}$ of a tone in music audio signal for which timbral replacement is desired, an inharmonic component distribution parameter may be parallel-shifted on the time domain as shown in FIG. 18. Thus, the synchronized inharmonic component distribution parameter M(l,k)(f,r) is obtained. The interpolated inharmonic component distribution parameter M(l,k)(f,r) for a tone having an arbitrary duration in the music audio signal, for which timbral replacement is desired, is obtained by interpolating the synchronized inharmonic component distribution parameter M(l,k)(f,r) using the following expression.

$$\hat{M}^{(I,k)}(f,r)=\exp[(1-\alpha)\log(\overline{M}^{(I,k)}(f,r))+\alpha\log(\hat{M}^{(I,k+1)}(f,r)]$$ <Expression 18>

Figure 19:
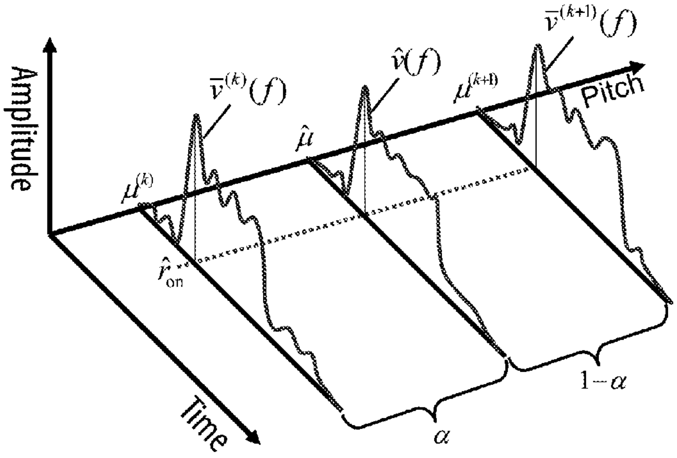
FIG. 19 schematically illustrates interpolation of inharmonic component distribution parameters.

In the above expression, M(l,k)(f,r) and M(l,k+1)(f,r) denote inharmonic component distribution parameters of a replaced audio signal having the most neighboring pitches in the low-frequency and high-frequency ranges, respectively. The interpolation ratio used for harmonic peak parameters is also used for inharmonic component distribution parameters. FIG. 19 schematically illustrates the interpolation of inharmonic component distribution parameters mentioned above. Further, in the inharmonic component energy ω(I) which composes the harmonic peak parameter and the inharmonic component distribution parameter, errors may be reduced by using a function when analyzing the parameters of the replaced audio signal. The more replaced audio signals used in the interpolation, the better for the interpolation. In this embodiment, a pitch-dependent feature function reported in non-patent document 5 is employed to predict harmonic peak parameters and inharmonic component distribution parameters from the pitch-dependent feature function which has learned those parameters.

Figure 12:
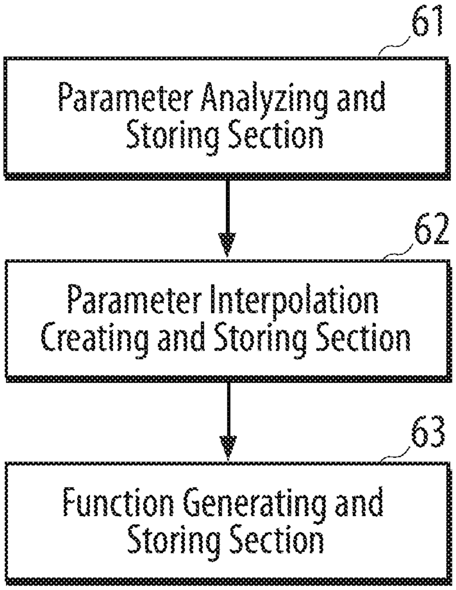
FIG. 12 illustrates a specific configuration of a replacement parameter storing section.

In step ST4, learning is performed by of the pitch-dependent feature function. The learning method and parameters to be learnt are the same as those used in pitch manipulation mentioned above. The step ST4 is implemented as a function generating and storing section 63 as shown in FIG. 12. The function generating and storing section 63 stores the harmonic peak parameters for each tone generated by the music instrument of the second kind as pitch-dependent feature functions, based on data stored in the parameter analyzing and storing section 61 and the parameter interpolation creating and storing section 62. Specifically in step ST4, coefficients for a regression function are estimated by the least squares method based on the features of musical instrument sounds generated by a single musical instrument that have been generated in step ST3. Refer to FIG. 13, the third row from the top. This regression function is called pitch-dependent feature function. Specifically, the pitch-dependent feature function represents the envelopes of harmonic peaks occurring with the same frequency by gathering those harmonic peaks from the respective orders, first to n-th, based on the harmonic peak parameters indicating the relative amplitudes of n-th order harmonic components of one tone. Given such function, a plurality of harmonic peaks included in the harmonic peak parameters of a tone generated by the musical instrument of the second kind may be obtained from the pitch-dependent feature function for each order. Errors at the time of analyzing a plurality of learning data may be reduced by using the pitch-dependent feature function.

In this embodiment, the pitch-dependent feature function implemented in step ST4 is not essential. If the accuracy of step ST3 is high, data acquired in step ST3 may be used without modifications. The parameters for each tone generated by the musical instrument of the second kind may be created by an arbitrary method, and is not limited to the method employed in this embodiment.

Returning to FIG. 11, in step ST5, replaced harmonic parameters are created by replacing a plurality of harmonic peaks included in the harmonic peak parameters indicating the relative amplitudes of the n-th order harmonic components of each tone generated by the musical instrument of the first kind with a plurality, of harmonic peaks included in the harmonic peak parameters indicating the relative amplitudes of the n-th order harmonic components of each tone generated by the musical instrument of the second kind and corresponding to each tone generated by the musical instrument of the first kind. In step ST5, the harmonic peaks of the musical instrument sounds generated by the musical instrument of the second kind, which are required for the replacement, are acquired from the pitch-dependent feature functions obtained in step ST4. In step ST6, it is determined whether or not the musical instrument of the first kind and the musical instrument of the second kind belong to the same category of musical instruments. If it is determined that both musical instruments belong to the same category of musical instruments in step ST6, the process goes to step ST8. If it is determined that both musical instruments do not belong to the same category of musical instruments in step ST6, the process goes to step ST7. In step ST7, the power envelope parameters indicating the temporal power envelopes of the n-th order harmonic components of each tone generated by the musical instrument of the second kind are acquired. These power envelope parameters have been obtained in steps ST2 through ST4. Replaced power envelope parameters are created by replacing the power envelope parameters indicating the temporal power envelopes of the n-th order harmonic components of each tone generated by the musical instrument of the first kind with the power envelope parameters indicating the temporal power envelopes of the n-th order harmonic components of each tone generated by the musical instrument of the second kind and corresponding to each tone generated by the musical instrument of the first kind. In step ST7, replaced inharmonic component distribution parameters are also created.

If it is determined that both musical instruments belong to the same category of musical instruments in step ST6, a synthesized separated audio signal for each tone is generated in step ST8 using parameters other than the harmonic peak parameters, which are stored in the separated audio signal analyzing and storing section, as well as the replaced harmonic peak parameters, which are stored in the replaced parameter creating and storing section, if the music instrument category determining section determines that the musical instrument of the first kind and the musical instrument of the second kind belong to the same category. A synthesized separated audio signal for each tone is generated in step ST8 using parameters other than the harmonic peak parameters and the power envelope parameters as well as the replaced harmonic peak parameters and the replaced power envelope parameters if the music instrument category determining section determines that the musical instrument of the first kind and the musical instrument of the second kind belong to different categories. In the last step ST9, the synthesized separated audio signal and the residual audio signal are added to output a music audio signal including the audio signal of music instrument sounds generated by the musical instrument of the second kind.

In the algorithm of FIG. 11, it is determined whether or not the musical instrument of the first kind and the musical instrument of the second kind belong to the same category of musical instruments in step ST6. The determination of the category of musical instruments may be performed prior to step ST5. If it is determined from the beginning that timbral replacement should be done between the audio signals of the musical instrument sounds generated by the musical instruments which belong to the same category of musical instruments, step ST7 is not necessary and steps ST2 through ST4 need not deal with the power envelope parameters.

Next, a specific implementation of the embodiment shown in FIG. 1 will be described below.

[Pitch Manipulation]

In pitch manipulation, a pitch trajectory μ(r) which forms a spectral envelope is multiplied by a real number α where $0 \leq \alpha \leq 1$ to decrease the pitch and $1 < \alpha$ to increase the pitch. Defining a desired pitch after the pitch manipulation as μ(r), the following expression holds:

$$\hat{\mu}(r) = \alpha\mu(r) \quad \text{<Expression 19>}$$

For example, when α=2, a musical instrument sound having pitch one octave higher than a tone or seed is synthesized. The relative amplitudes $V_n$ of harmonic peaks of musical instrument sounds are obtained by normalizing the relative amplitudes of harmonic peaks for overtones predicted based on the pitch-dependent feature functions with a constraint $\Sigma_n V_n=1$. The inharmonic energy $\omega^{(I)}$ is obtained by dividing the harmonic energy $\omega^{(H)}$ by the ratio $\omega^{(H)}/\omega^{(I)}$ of inharmonic energy to harmonic energy.

[Duration Manipulation]

In duration manipulation, the temporal envelopes $E_n(r)$ between the onset and offset and the pitch trajectory μ(r) are manipulated. The manipulated temporal envelopes and pitch trajectory are defined as $E_n$ and μ(r), respectively.

[Onset and Offset Detection]

The term “onset” used herein is defined as the moment at which the temporal amplitude of a musical instrument reaches a sufficient level and then the amplitude variation becomes steady. The term “offset” used herein is defined as the moment at which the temporal amplitude is large enough and the amplitude variation or variation in energy loses the steady condition. According to these definitions, the onset and offset are detected as follows:

⟨Expression 20⟩

$$r_{on} = \min\left(r \,\middle|\, \mathrm{abs}\left[\frac{d\bar{E}(r)}{dr}\right] \le \epsilon,\ \bar{E}(r) \ge \kappa\right)$$

$$r_{off} = \max\left(r \,\middle|\, \mathrm{abs}\left[\frac{d\bar{E}(r)}{dr}\right] \le \epsilon,\ \bar{E}(r) \ge \kappa\right)$$

In the above expression, Th denotes a threshold indicating a sufficient level of the temporal amplitude of a musical instrument sound. This detection method is applicable to wind and bowed string instruments. However, it is not applicable to string instruments that are plucked or struck. The onset and offset occur at the same time in these musical instruments. Therefore, the temporal envelopes between the onset and offset cannot be expanded or shrunk. By reference to the amplitude control of string instruments that are plucked or struck in a synthesizer, the end of the temporal envelope parameters is regarded as an offset for these instruments. The power envelope parameters after the onset are to be manipulated.

[Musical Score Manipulation]

Figure 21:
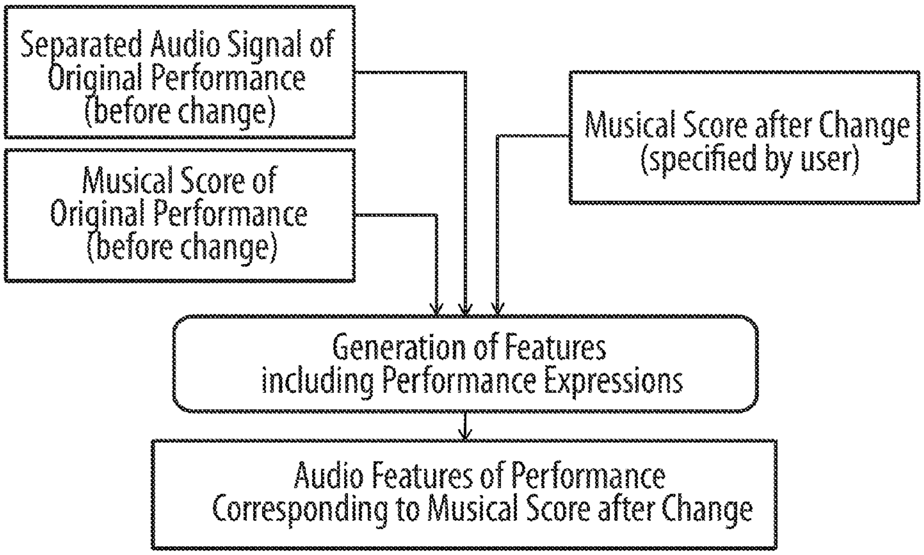
FIG. 21 schematically illustrates musical score manipulation.

The features of each tone included in a musical score after the change and specified by the user are generated based on the similarity in musical score structure between the original musical score that has been analyzed (original musical performance) and the changed musical score. FIG. 21 schematically illustrates the flow of musical score manipulation. The features including performance expressions are extracted from an audio signal of the original musical performance, and the features of the changed musical score are generated based on the similarity in musical score structure. The inventors employed a method of calculating the features of j tone in the changed musical score based on the features of a tone included in the original musical score that has similar note number N and duration L. First, two tones satisfying the following conditions are selected from the analyzed original musical score with respect to the j tone of the changed musical score.

⟨Expression 21⟩

$$q_j^- = \underset{k}{\mathrm{argmin}} \sum_{p=-1,0} \left(|\bar{N}_{j+p} - N_{k+p}| + \alpha|\bar{L}_{j+p} - L_{k+p}|\right)$$

$$q_j^+ = \underset{k}{\mathrm{argmin}} \sum_{p=0,1} \left(|\bar{N}_{j+p} - N_{k+p}| + \alpha|\bar{L}_{j+p} - L_{k+p}|\right)$$

In the above expression, $N_k$ and $L_k$ denote a note number and duration in the original musical score, respectively; $N^-_j$ and $L^-_3$ denote a note number and duration in the changed musical score, respectively; and α denotes a constant for determining the weight for them. Next, the features of two tones thus obtained are mixed to calculate a tone model suitable for the j tone.

⟨Expression 22⟩

$$\tilde{Feature}^{(j)}(r) = \left(1 - \frac{r}{\bar{L}_j}\right)Feature^{(q_j^-)}(r) + \frac{r}{\bar{L}_j}Feature^{(q_j^+)}(r)$$

In the above expression, $Feature^j(r)$ represents a feature in time frame t among the features of the j tone. Four arithmetic operations are defined to be performed on the respective parameters.

$$Feature^{(q_j^-)}(r), Feature^{(q_j^+)}(r)$$

$Feature(q^-_j)(r)$ and $Feature(q^+_j)(r)$ are obtained by manipulating the features of $q^-_j$ and $q^+_j$ tones in the original musical score such that the pitch may be $N^-_j$ and the duration may be $L^-_j$. This expression means that the mixing ratio of the features of the two tones temporally is shifted from 1:0 to 0:1. Since $q^+_j=q^-_{j+1}$, pairs of two adjacent tones in the original musical score are sequentially connected smoothly in accordance with the changed musical score. [Modeling of Pitch Trajectory]

A pitch trajectory model is constructed based on a sinusoidal model on an assumption that the periodic variations in pitch are temporally stable for the purpose of modeling of the pitch trajectory μ(r) between the onset and offset. The pitch trajectory after duration manipulation is represented as follows:

⟨Expression 23⟩

$$\hat{\mu}(r) = \sum_k A_k^{(\mu)}\exp\left[j\omega_k^{(\mu)}r + \phi_k^{(\mu)}\right] + \int \mu(r)dr/R$$

In the above expression, R denotes the number of frames. Unknown parameters of this model are the amplitude $A_k(\mu)$, frequency $\omega_k(\mu)$ and phase $\phi_k(\mu)$ that make up the pitch trajectory. These parameters can be estimated by using an existing parameter estimation method of a sinusoidal model.

[Timbral Manipulation]

The features of each interpolated timbre are obtained as follows:

⟨Expression 24⟩

$$Feature^{(P)} = \exp\left[\sum_k \alpha_k \log(Feature^{(k)})\right]$$

In the above expression, Feature includes the timbral features $V_n$, $M^{(I)}(f,r)$, and $E_n(r)$; k and P are indexes to each tone or seed and to the interpolated features, respectively. Alignment is not necessary for the relative amplitudes of harmonic peaks. Alignment is done only at the onset for the inharmonic component distribution $M^{(I)}(f,r)$. For the temporal envelopes $E_n(r)$, alignment is done after duration manipulation such that the onsets and offsets are aligned among the temporal envelopes.

[Synthesis of Musical Instrument Sounds]

Harmonic signals $S_H(t)$ and inharmonic signals $S_I(t)$ are synthesized from the harmonic and inharmonic models, respectively. Finally, an output musical instrument sound s(t) is synthesized by adding these signals as follows:

$$s(t)=s_H(t)+s_I(t) \qquad \text{<Expression 25>}$$

In the above expression, t denotes a sampling address for a sampled signal.

[Synthesis of Harmonic Signal]

The following sinusoidal model is used to synthesize a harmonic signal $S_H(t)$.

⟨Expression 26⟩

$$S_H(t) = \sum_n A_n(t)\exp[j\phi_n(t)]$$

In the above expression, $A_n(t)$ and $\phi_n(t)$ are the instantaneous amplitude and instantaneous phase of the n-th sinusoidal wave, respectively. In this model, it is assumed that the amplitude and frequency of each sinusoidal wave have stationarity, or in other words, do not change little by little as the time elapses. The instantaneous phase is obtained by integrating the pitch trajectory that has been obtained by spline interpolating the pitch trajectory analyzed in units of frame.

$$\phi_n(t)=\phi_n(0)^*+n\sqrt{1+Bn^2}\int_0^t\hat{\mu}(\tau)d\tau \qquad \text{<Expression 27>}$$

In the above expression, $\phi_n(0)$ is an arbitrary initial phase. In the sinusoidal model, a tracked peak is used as an instantaneous amplitude. In a harmonic model depicting an outline of a harmonic structure, a tracked peak is considered to be an integration of the power envelope parameter and harmonic energy over an average of respective Gaussian functions of the spectral envelope. Since a model for extracting features and a model for synthesizing musical instrument sounds are different, the relative amplitudes of harmonic peaks for the synthesized sounds do not always coincide with those for the musical instrument sounds to be analyzed. Experimentally, the features did not significantly change through these operations. It follows from this that the model difference may have little influence on the timbres. Therefore, the instantaneous amplitude is obtained as follows:

⟨Expression 28⟩

$$A_n(t) = \frac{w^{(H)}\hat{v}_n\hat{E}_n(t)}{\sqrt{2\pi}\,\sigma}$$

In the above expression, the temporal envelope $E_n(r)$ is the one obtained by spline interpolation in sample units.

[Synthesis of Inharmonic Signal]

The overlap-add method is used to synthesize an inharmonic signal $S_I(t)$. The inharmonic model $\omega^{(I)}M^{(I)}(f,r)$ which has been multiplied by inharmonic energy $\omega^{(I)}$ is regarded as a spectrogram, and is then converted into a signal. Here, the phase of the seed is used.

Next, the use of the cost function added with a constraint based on the onset and offset information will be described below.

The harmonic/inharmonic integrated model is adapted to polyphonic sounds where target sounds for separation exist by minimizing the following cost function.

⟨Expression 29⟩

$$J = \sum_n \iint \left( S_n^{(H)}(f,r)\log\frac{S_n^{(H)}(f,r)}{w^{(H)}E_n(r)F_n(f,r)} - S_n^{(H)}(f,r) + w^{(H)}E_n(r)F_n(f,r) \right) df\,dr + \tag{1}$$

$$\iint \left( S^{(I)}(f,r)\log\frac{S^{(I)}(f,r)}{w^{(I)}M^{(I)}(f,r)} - S^{(I)}(f,r) + w^{(I)}M^{(I)}(f,r) \right) df\,dr + \lambda^{(v)}\left(\sum_n v_n - 1\right) +$$

$$\sum_n \left(\lambda^{(E_n)}\left(\int E_n(r)dr - 1\right)\right) + \beta^{(v)}\sum_n\left(\overline{v}_n\log\frac{\overline{v}_n}{v_n} - \overline{v}_n + v_n\right) +$$

$$\beta^{(I)}\iint\left( M^{(I)}(f,r)\log\frac{M^{(I)}(f,r)}{\overline{M}^{(I)}(f,r)} - M^{(I)}(f,r) + \overline{M}^{(I)}(f,r) \right) df\,dr +$$

$$\beta^{(E)}\int\left(\overline{E}(r)\log\frac{\overline{E}(r)}{E_n(r)} - \overline{E}(r) + E_n(r)\right)dr$$

The above cost function is different from the cost function represented by expression 6 in the following two points.

1. A distance indicating the independency between the relative amplitude $V_n$ of a harmonic peak and the constraint parameter $V^{-}_n$ is added to the cost function.

2. The constraint parameter $E^{-}_n(r)$ of the temporal envelope is different from the average temporal envelope.

The constraint parameter $E^{-}_n(r)$ is obtained by minimizing the above cost function only with respect of the spectrogram between the onset and offset. $V^{-}_n$ is calculated as follows:

⟨Expression 30⟩

$$\overline{v}_n = \frac{\int_{r_{on}}^{r_{off}}\int S_n^{(H)}(f,r)df\,dr}{\sum_n\int_{r_{on}}^{r_{off}}\int S_n^{(H)}(f,r)df\,dr}$$

With the addition of a constraint cost relating to the relative amplitudes of harmonic peaks, updating the relative amplitudes of harmonic peaks is revised as follows:

⟨Expression 31⟩

$$v_n = \frac{\iint S_n^{(H)}(f,r)df\,dr + \beta^{(v)}\overline{v}_n}{\sum_n\iint S_n^{(H)}(f,r)df\,dr + \beta^{(v)}}$$

The constraint parameter $E^{-}_n(r)$ of the temporal envelope is obtained as follows:

$$\overline{E}(r)=\omega(r)\Sigma nE_n(r)/N \qquad \text{<Expression 32>}$$

The use of these expressions enables more accurate timbral change or manipulation.

⟨Expression 33⟩

$$\begin{cases} w(r) = \exp\left[-\frac{(r - r_{on})^2}{2\psi^2}\right] & (r < r_{on}) \\ w(r) = 1 & (r_{on} \leq r_{off}) \\ w(r) = \exp\left[-\frac{(r - r_{off})^2}{2\psi^2}\right] & (r_{off} < r) \end{cases}$$

Updating the pitch trajectory is represented as follows:

⟨Expression 34⟩

$$\mu(r) = \frac{\sum_n n \int S_n^{(H)}(f, r) f \sqrt{1 + \beta n^2}\, df}{\sum_n n^2 \int S_n^{(H)}(f, r)(1 + \beta n^2)\, df}$$

Updating inharmonicity is represented as follows:

⟨Expression 35⟩

$$B = \frac{2\sum_n \int\int S_n^{(H)}(f, r) n^3 \mu(r)(f - n\mu(r))\, df\, dr}{\sum_n \int\int S_n^{(H)}(f, r)(n^3 \mu(r))^2\, df\, dr}$$

Further, updating temporal envelopes is represented as follows:

⟨Expression 36⟩

$$E_n(r) = \frac{\int S_n^{(H)}(f, r)\, dr + \beta^{(E)} \overline{E}(r)}{\int\int w^{(H)} F_n(f, r)\, df\, dr + \beta^{(E)}}$$

In the above-mentioned embodiment, pitches, durations, timbres, and musical score are manipulated by replacing the tones generated by the musical instrument of the first kind with the tones generated by the musical instrument of the second kind. With this, a music audio signal may be generated even when an unknown musical score is played with the musical instrument of the first kind. The present invention is also applicable to music audio signal generation, which does not perform the replacement, when an unknown musical score is played with the musical instrument of the first kind.

INDUSTRIAL APPLICABILITY

According to the present invention, timbral change or manipulation is enabled by replacing or changing timbral parameters among parameters constructing a harmonic model, thereby readily implementing various timbral changes.

SIGN LISTING

1 Audio Signal Separating Section
2 Signal Extracting and Storing Section
3 Separated Audio Signal Analyzing and Storing Section
4 Replaced Parameter Creating and Storing Section
5 Musical Instrument Category Determining Section
6 Replacement Parameter Storing Section
7 Synthesized Separated Audio Signal Generating Section
8 Signal Adding Section
9A Pitch Manipulating Section
9B Duration Manipulating Section

The invention claimed is:

1. A music audio signal generating system comprising:

a processor; and a memory;

the memory embodying instructions that when executed by the processor cause the processor to function as:

a signal extracting and storing section configured to extract a separated audio signal including only an audio signal of musical instrument sounds generated by a musical instrument of a first kind from a music audio signal including the audio signal of the musical instrument sounds generated by the musical instrument of the first kind and store the separated audio signal for each tone of the musical instrument sounds, and also store a residual audio signal;

a separated audio signal analyzing and storing section configured to analyze a plurality of parameters for each tone including at least harmonic peak parameters indicating relative amplitudes of n-th order harmonic components and power envelope parameters indicating temporal power envelopes of the n-th order harmonic components and then store the plurality of parameters in order to represent the separated audio signal for each tone using a harmonic model that is formulated by the plurality of parameters;

a replacement parameter storing section configured to store harmonic peak parameters indicating relative amplitudes of n-th order harmonic components of a plurality of tones generated by a musical instrument of a second kind, the harmonic peak parameters being created from an audio signal of musical instrument sounds generated by the musical instrument of the second kind that is different from the musical instrument of the first kind, and required to represent, using the harmonic model, audio signals of the plurality of tones generated by the musical instrument of the second kind and corresponding to all of the tones included in the separated audio signal;

a replaced parameter creating and storing section configured to create replaced harmonic peak parameters by replacing a plurality of harmonic peaks included in the harmonic peak parameters, which are stored in the separated audio signal analyzing and storing section and indicate the relative amplitudes of the n-th order harmonic components of each tone generated by the musical instrument of the first kind, with harmonic peaks included in the harmonic peak parameters, which are stored in the replacement parameter storing section and indicate the relative amplitudes of the n-th order harmonic components of each tone generated by the musical instrument of the second kind and corresponding to each tone generated by the musical instrument of the first kind, and then store the replaced harmonic peak parameters thus created;

a synthesized separated audio signal generating section configured to generate a synthesized separated audio signal for each tone using parameters other than the harmonic peak parameters, which are stored in the separated audio signal analyzing and storing section, and the replaced harmonic peak parameters stored in the replaced parameter creating and storing section; and a signal adding section configured to add the synthesized separated audio signal and the residual audio signal to output a music audio signal including the audio signal of music instrument sounds generated by the musical instrument of the second kind.

2. A music audio signal generating system comprising:

a processor; and a memory;

the memory embodying instructions that when executed by the processor cause the processor to function as:

a signal extracting and storing section configured to extract a separated audio signal including only an audio signal of musical instrument sounds generated by a musical instrument of a first kind from a music audio signal including the audio signal of the musical instrument sounds generated by the musical instrument of the first kind and store the separated audio signal for each tone of the musical instrument sounds, and also store a residual audio signal;

a separated audio signal analyzing and storing section configured to analyze a plurality of parameters for each tone including at least harmonic peak parameters indicating relative amplitudes of n-th order harmonic components and power envelope parameters indicating temporal power envelopes of the n-th order harmonic components and then store the plurality of parameters in order to represent the separated audio signal for each tone using a harmonic model that is formulated by the plurality of parameters;

a replacement parameter storing section configured to store harmonic peak parameters indicating relative amplitudes of n-th order harmonic components of a plurality of tones generated by a musical instrument of a second kind and power envelope parameters indicating temporal power envelopes of the n-th order harmonic components, the harmonic peak parameters and the power envelop parameters being created from an audio signal of musical instrument sounds generated by the musical instrument of the second kind that is different from the musical instrument of the first kind, and required to represent, using the harmonic model, audio signals of the plurality of tones generated by the musical instrument of the second kind and corresponding to all of the tones included in the separated audio signal;

a replaced parameter creating and storing section configured to create replaced harmonic peak parameters by replacing a plurality of harmonic peaks included in the harmonic peak parameters, which are stored in the separated audio signal analyzing and storing section and indicate the relative amplitudes of the n-th order harmonic components of each tone generated by the musical instrument of the first kind, with harmonic peaks included in the harmonic peak parameters, which are stored in the replacement parameter storing section and indicate the relative amplitudes of the n-th order harmonic components of each tone generated by the musical instrument of the second kind and corresponding to each tone generated by the musical instrument of the first kind, and then store the replaced harmonic peak parameters thus created, and also configured to create replaced power envelope parameters by replacing the power envelope parameters, which are stored in the separated audio signal analyzing and storing section and indicate the temporal power envelopes of the n-th order harmonic components of each tone generated by the musical instrument of the first kind, with the power envelope parameters, which are stored in the replacement parameter storing section and indicate the temporal power envelopes of the n-th order harmonic components of each tone generated by the musical instrument of the second kind and corresponding to each tone generated by the musical instrument of the first kind, and then store the replaced power envelope parameters thus created;

a synthesized separated audio signal generating section configured to generate a synthesized separated audio signal for each tone using parameters other than the harmonic peak parameters and the power envelope parameters, which are stored in the separated audio signal analyzing and storing section, as well as the replaced harmonic peak parameters and the replaced power envelope parameters stored in the replaced parameter creating and storing section; and a signal adding section configured to add the synthesized separated audio signal and the residual audio signal to output a music audio signal including the audio signal of music instrument sounds generated by the musical instrument of the second kind.

3. A music audio signal generating system comprising:

a processor; and a memory;

the memory embodying instructions that when executed by the processor cause the processor to function as:

a signal extracting and storing section configured to extract a separated audio signal including only an audio signal of musical instrument sounds generated by a musical instrument of a first kind from a music audio signal including the audio signal of the musical instrument sounds generated by the musical instrument of the first kind, and store the separated audio signal for each tone of the musical instrument sounds, and also store a residual audio signal;

a separated audio signal analyzing and storing section configured to analyze a plurality of parameters for each tone including at least harmonic peak parameters indicating relative amplitudes of n-th order harmonic components and power envelope parameters indicating temporal power envelopes of the n-th order harmonic components and then store the plurality of parameters in order to represent the separated audio signal for each tone using a harmonic model that is formulated by the plurality of parameters;

a replacement parameter storing section configured to store harmonic peak parameters indicating relative amplitudes of n-th order harmonic components of a plurality of tones generated by a musical instrument of a second kind and power envelope parameters indicating temporal power envelopes of the n-th order harmonic components, the harmonic peak parameters and the power envelop parameters being created from an audio signal of musical instrument sounds generated by the musical instrument of the second kind that is different from the musical instrument of the first kind, and required to represent, using the harmonic model, audio signals of the plurality of tones generated by the musical instrument of the second kind and corresponding to all of the tones included in the separated audio signal;

a musical instrument category determining section configured to determine whether or not the musical instrument of the first kind and the musical instrument of the second kind belong to the same category of musical instruments;

a replaced parameter creating and storing section configured to create replaced harmonic peak parameters by replacing a plurality of harmonic peaks included in the harmonic peak parameters, which are stored in the separated audio signal analyzing and storing section and indicate the relative amplitudes of the n-th order harmonic components of each tone generated by the musical instrument of the first kind, with harmonic peaks included in the harmonic peak parameters, which are stored in the replacement parameter storing section and indicate the relative amplitudes of the n-th order harmonic components of each tone generated by the musical instrument of the second kind and corresponding to each tone generated by the musical instrument of the first kind, and then store the replaced harmonic peak parameters thus created, and also configured to create replaced power envelope parameters by replacing the power envelope parameters, which are stored in the separated audio signal analyzing and storing section and indicate the temporal power envelopes of the n-th order harmonic components of each tone generated by the musical instrument of the first kind, with the power envelope parameters, which are stored in the replacement parameter storing section and indicate the temporal power envelopes of the n-th order harmonic components of each tone generated by the musical instrument of the second kind and corresponding to each tone generated by the musical instrument of the first kind, and then store the replaced power envelope parameters thus created;

a synthesized separated audio signal generating section configured to generate a synthesized separated audio signal for each tone, using parameters other than the harmonic peak parameters, which are stored in the separated audio signal analyzing and storing section, and the replaced harmonic peak parameters stored in the replaced parameter creating and storing section if the music instrument category determining section determines that the musical instrument of the first kind and the musical instrument of the second kind belong to the same category, or using parameters other than the harmonic peak parameters and the power envelope parameters, which are stored in the separated audio signal analyzing and storing section, as well as the replaced harmonic peak parameters and the replaced power envelope parameters stored in the replaced parameter creating and storing section if the music instrument category determining section determines that the musical instrument of the first kind and the musical instrument of the second kind belong to different categories; and a signal adding section configured to add the synthesized separated audio signal and the residual audio signal to output a music audio signal including the audio signal of music instrument sounds generated by the musical instrument of the second kind.

4. The music audio signal generating system according to claim 2, wherein:

the separated audio signal analyzing and storing section further has a function of storing an inharmonic component distribution parameter indicating the distribution of inharmonic components of each of the tones of a plurality of kinds generated by the musical instrument of the first kind;

the replacement parameter storing section further has a function of storing an inharmonic component distribution parameter indicating the distribution of inharmonic components of each of the tones of a plurality of kinds included in the audio signal of the musical instrument sounds generated by the musical instrument of the second kind;

the replaced parameter creating and storing section further has a function of creating a replaced inharmonic component distribution parameter indicating the distribution of inharmonic components of each tone by replacing the inharmonic component distribution parameter, which is stored in the separated audio signal analyzing and storing section, for each tone included in the musical instrument sounds generated by the musical instrument of the first kind with the inharmonic component distribution parameter, which is stored in the replacement parameter storing section, for each tone included in the musical instrument sounds generated by the musical instrument of the second kind and corresponding to each tone generated by the musical instrument of the first kind, and then storing the replaced inharmonic component distribution parameter thus created; and the synthesized separated audio signal generating section generates a synthesized separated audio signal for each tone using parameters other than the harmonic peak parameter, the power envelope parameter, and the inharmonic component distribution parameter, which are stored in the separated audio signal analyzing and storing section, as well as the replaced harmonic peak parameter, the replaced power envelope parameter, and the replaced inharmonic component distribution parameter that are stored in the replaced parameter creating and storing section.

5. The music audio signal generating system according to claim 2, wherein:

the replacement parameter storing section comprises:

a parameter analyzing and storing section configured to analyze and store at least harmonic peak parameters for tones of a plurality of kinds that are obtained from an audio signal of musical instrument sounds generated by the musical instrument of the second kind, the harmonic peak parameters indicating relative amplitudes of n-th order harmonic components for each tone and required to represent a separated audio signal for each tone using the harmonic model, and also configured to store power envelope parameters indicating temporal power envelopes of the n-th order harmonic components for each of tones of the plurality of kinds;

a parameter interpolation creating and storing section configured to create the harmonic peak parameters by an interpolation method for tones other than the tones of the plurality of kinds among the tones generated by the musical instrument of the second kind and corresponding to all of the tones included in the separated audio signal, based on the harmonic peak parameters and the power envelope parameters that are stored in the parameter analyzing and storing section, the harmonic peak parameters being required to represent the tones other than the tones of the plurality of kinds using the harmonic model, and then store the harmonic peak parameters thus created; and the parameter analyzing and storing section stores the power envelope parameters indicating temporal power envelopes of the n-th order harmonic components, which are obtained by analysis, as representative power envelope parameters.

6. The music audio signal generating system according to claim 2, wherein:

the replacement parameter storing section comprises:

a parameter analyzing and storing section configured to analyze and store at least harmonic peak parameters indicating relative amplitudes of n-th order harmonic components of each of the tones of a plurality of kinds and power envelope parameters indicating temporal power envelopes of the n-th order harmonic components; and a parameter interpolation creating and storing section configured to create the harmonic peak parameters and the power envelope parameters by an interpolation method for tones other than the tones of the plurality of kinds among the tones generated by the musical instrument of the second kind and corresponding to all of the tones included in the separated audio signal, based on the harmonic peak parameters and the power envelope parameters that are stored in the parameter analyzing and storing section, the harmonic peak parameters and the power envelope parameters being required to represent an audio signal of the tones other than the tones of the plurality of kinds using the harmonic model, and then store the harmonic peak parameters and the power envelope parameters thus created.

7. The music audio signal generating system according to claim 5, wherein:

the replacement parameter storing section further comprises a function generating and storing section configured to store the harmonic peak parameters for each tone generated by the music instrument of the second kind as pitch-dependent feature functions, based on data stored in the parameter analyzing and storing section and the parameter interpolation creating and storing section; and the replaced parameter creating and storing section is configured to acquire a plurality of peaks included in the harmonic peak parameters for each tone generated by the music instrument of the second kind from the pitch-dependent feature functions.

8. The music audio signal generating system according to claim 1, wherein the instructions further cause the processor to function as an audio signal separating section configured to separate the music audio signal from a polyphonic audio signal including the music audio signal.

9. The music audio signal generating system according to claim 1, wherein the instructions further cause the processor to function as an audio signal separating section configured to separate the music audio signal from a polyphonic audio signal including the music audio signal, wherein audio signals other than the music audio signal are included in the residual audio signal.

10. The music audio signal generating system according to claim 9, wherein musical instrument sounds generated by the musical instrument of the second kind are acquired from another music audio signal obtained from the polyphonic audio signal including the music audio signal.

11. The music audio signal generating system according to claim 1, wherein the harmonic model is a harmonic model having inharmonicity of a harmonic structure incorporated thereinto.

12. The music audio signal generating system according to claim 1, wherein the instructions further cause the processor to function as a pitch manipulating section configured to manipulate pitch parameters relating to pitches and a duration manipulating section configured to manipulate duration parameters relating to durations, wherein the pitch parameters and the duration parameters are included in a plurality of parameters to be analyzed by the separated audio signal analyzing and storing section.

13. A music audio signal generating method implemented in a computer to cause the computer to execute the steps of:

extracting a separated audio signal including only an audio signal of each tone included in musical instrument sounds generated by a musical instrument of a first kind from a music audio signal including the audio signal of the musical instrument sounds generated by the musical instrument of the first kind, and also extracting a residual audio signal;

analyzing a plurality of parameters for each tone including at least harmonic peak parameters indicating relative amplitudes of n-th order harmonic components and power envelope parameters indicating temporal power envelopes of the n-th order harmonic components in order to represent the separated audio signal for each tone using a harmonic model that is formulated by the plurality of parameters;

creating harmonic peak parameters indicating relative amplitudes of n-th order harmonic components of each tone generated by a musical instrument of a second kind based on an audio signal of musical instrument sounds generated by the musical instrument of the second kind that is different from the musical instrument of the first kind, wherein the harmonic peak parameters are required to represent, using the harmonic model, audio signals of a plurality of tones generated by the musical instrument of the second kind and corresponding to all of the tones included in the separated audio signal;

creating replaced harmonic peak parameters by replacing a plurality of harmonic peaks included in the harmonic peak parameters indicating the relative amplitudes of the n-th order harmonic components of each tone generated by the musical instrument of the first kind with a plurality of harmonic peaks included in the harmonic peak parameters indicating the relative amplitudes of the n-th order harmonic components of each tone generated by the musical instrument of the second kind and corresponding to each tone generated by the musical instrument of the first kind;

generating a synthesized separated audio signal for each tone using parameters other than the harmonic peak parameters and the replaced harmonic peak parameters; and adding the synthesized separated audio signal and the residual audio signal to output a music audio signal including the audio signal of music instrument sounds generated by the musical instrument of the second kind.

14. A music audio signal generating method implemented in a computer to cause the computer to execute the steps of:

extracting a separated audio signal including only an audio signal of each tone included in musical instrument sounds generated by a musical instrument of a first kind from a music audio signal including the audio signal of the musical instrument sounds generated by the musical instrument of the first kind, and also extracting a residual audio signal;

analyzing a plurality of parameters for each tone including at least harmonic peak parameters indicating relative amplitudes of n-th order harmonic components and power envelope parameters indicating temporal power envelopes of the n-th order harmonic components in order to represent the separated audio signal for each tone using a harmonic model that is formulated by the plurality of parameters;

creating harmonic peak parameters indicating relative amplitudes of n-th order harmonic components of each tone generated by a musical instrument of a second kind and power envelope parameters indicating temporal power envelopes of the n-th order harmonic components based on an audio signal of musical instrument sounds generated by the musical instrument of the second kind that is different from the musical instrument of the first kind, wherein the harmonic peak parameters and the power envelope parameters are required to represent, using the harmonic model, audio signals of the tones generated by the musical instrument of the second kind and corresponding to all of the tones included in the separated audio signal;

creating replaced harmonic peak parameters by replacing a plurality of harmonic peaks included in the harmonic peak parameters indicating the relative amplitudes of the n-th order harmonic components of each tone generated by the musical instrument of the first kind with a plurality of harmonic peaks included in the harmonic peak parameters indicating the relative amplitudes of the n-th order harmonic components of each tone generated by the musical instrument of the second kind and corresponding to each tone generated by the musical instrument of the first kind, and also creating replaced power envelope parameters by replacing a feature region for the power envelope parameters indicating the temporal power envelopes of the n-th order harmonic components of each tone generated by the musical instrument of the first kind with a feature region for the power envelope parameters indicating the temporal power envelopes of the n-th order harmonic components of each tone generated by the musical instrument of the second kind and corresponding to each tone generated by the musical instrument of the first kind;

generating a synthesized separated audio signal for each tone using parameters other than the harmonic peak parameters and the power envelope parameters as well as the replaced harmonic peak parameters and the replaced power envelope parameters; and adding the synthesized separated audio signal and the residual audio signal to output a music audio signal including the audio signal of music instrument sounds generated by the musical instrument of the second kind.

15. A music audio signal generating method implemented in a computer to cause the computer to execute the steps of:

extracting a separated audio signal including only an audio signal of each tone included in musical instrument sounds generated by a musical instrument of a first kind from a music audio signal including the audio signal of the musical instrument sounds generated by the musical instrument of the first kind, and also extracting a residual audio signal;

analyzing a plurality of parameters for each tone including at least harmonic peak parameters indicating relative amplitudes of n-th order harmonic components and power envelope parameters indicating temporal power envelopes of the n-th order harmonic components in order to represent the separated audio signal for each tone using a harmonic model that is formulated by the plurality of parameters;

creating harmonic peak parameters indicating relative amplitudes of n-th order harmonic components of each tone generated by a musical instrument of a second kind and power envelope parameters indicating temporal power envelopes of the n-th order harmonic components based on an audio signal of musical instrument sounds generated by the musical instrument of the second kind that is different from the musical instrument of the first kind, wherein the harmonic peak parameters and the power envelope parameters are required to represent, using the harmonic model, audio signals of the tones generated by the musical instrument of the second kind and corresponding to all of the tones included in the separated audio signal;

determining whether or not the musical instrument of the first kind and the musical instrument of the second kind belong to the same category of musical instruments;

creating replaced harmonic peak parameters by replacing a plurality of harmonic peaks included in the harmonic peak parameters indicating the relative amplitudes of the n-th order harmonic components of each tone generated by the musical instrument of the first kind with a plurality of harmonic peaks included in the harmonic peak parameters and indicating the relative amplitudes of the n-th order harmonic components of each tone generated by the musical instrument of the second kind and corresponding to each tone generated by the musical instrument of the first kind, and also creating replaced power envelope parameters by replacing a feature region for the power envelope parameters indicating the temporal power envelopes of the n-th order harmonic components of each tone generated by the musical instrument of the first kind with a feature region for the power envelope parameters indicating the temporal power envelopes of the n-th order harmonic components of each tone generated by the musical instrument of the second kind and corresponding to each tone generated by the musical instrument of the first kind;

generating a synthesized separated audio signal for each tone using parameters other than the harmonic peak parameters and the replaced harmonic peak parameters if the music instrument category determining section determines that the musical instrument of the first kind and the musical instrument of the second kind belong to the same category, or using parameters other than the harmonic peak parameters and the power envelope parameters as well as the replaced harmonic peak parameters and the replaced power envelope parameters if the music instrument category determining section determines that the musical instrument of the first kind and the musical instrument of the second kind belong to different categories; and adding the synthesized separated audio signal and the residual audio signal to output a music audio signal including the audio signal of music instrument sounds generated by the musical instrument of the second kind.

16. A non-transitory computer readable recording medium recorded with computer program for music audio signal generation to be installed in a computer to cause the computer to execute the steps of:

extracting a separated audio signal including only an audio signal of each tone included in musical instrument sounds generated by a musical instrument of a first kind from a music audio signal including the audio signal of the musical instrument sounds generated by the musical instrument of the first kind, and also extracting a residual audio signal;

analyzing a plurality of parameters for each tone including at least harmonic peak parameters indicating relative amplitudes of n-th order harmonic components and power envelope parameters indicating temporal power envelopes of the n-th order harmonic components in order to represent the separated audio signal for each tone using a harmonic model that is formulated by the plurality of parameters;

creating harmonic peak parameters indicating relative amplitudes of n-th order harmonic components of each tone generated by a musical instrument of a second kind based on an audio signal of musical instrument sounds generated by the musical instrument of the second kind that is different from the musical instrument of the first kind, wherein the harmonic peak parameters are required to represent, using the harmonic model, audio signals of the tones generated by the musical instrument of the second kind and corresponding to all of the tones included in the separated audio signal;

creating replaced harmonic peak parameters by replacing a plurality of harmonic peaks included in the harmonic peak parameters indicating the relative amplitudes of the n-th order harmonic components of each tone generated by the musical instrument of the first kind with a plurality of harmonic peaks included in the harmonic peak parameters indicating the relative amplitudes of the n-th order harmonic components of each tone generated by the musical instrument of the second kind and corresponding to each tone generated by the musical instrument of the first kind;

generating a synthesized separated audio signal for each tone using parameters other than the harmonic peak parameters and the replaced harmonic peak parameters; and adding the synthesized separated audio signal and the residual audio signal to output a music audio signal including the audio signal of music instrument sounds generated by the musical instrument of the second kind.

17. A non-transitory computer readable recording medium recorded with computer program for music audio signal generation to be installed in a computer to cause the computer to execute the steps of:

extracting a separated audio signal including only an audio signal of each tone included in musical instrument sounds generated by a musical instrument of a first kind from a music audio signal including the audio signal of the musical instrument sounds generated by the musical instrument of the first kind, and also extracting a residual audio signal;

analyzing a plurality of parameters for each tone including at least harmonic peak parameters indicating relative amplitudes of n-th order harmonic components and power envelope parameters indicating temporal power envelopes of the n-th order harmonic components in order to represent the separated audio signal for each tone using a harmonic model that is formulated by the plurality of parameters;

creating harmonic peak parameters indicating relative amplitudes of n-th order harmonic components of each tone generated by a musical instrument of a second kind and power envelope parameters indicating temporal power envelopes of the n-th order harmonic components based on an audio signal of musical instrument sounds generated by the musical instrument of the second kind that is different from the musical instrument of the first kind, wherein the harmonic peak parameters and the power envelope parameters are required to represent, using the harmonic model, audio signals of the tones generated by the musical instrument of the second kind and corresponding to all of the tones included in the separated audio signal;

creating replaced harmonic peak parameters by replacing a plurality of harmonic peaks included in the harmonic peak parameters indicating the relative amplitudes of the n-th order harmonic components of each tone generated by the musical instrument of the first kind with a plurality of harmonic peaks included in the harmonic peak parameters indicating the relative amplitudes of the n-th order harmonic components of each tone generated by the musical instrument of the second kind and corresponding to each tone generated by the musical instrument of the first kind, and also creating replaced power envelope parameters by replacing a feature region for the power envelope parameters indicating the temporal power envelopes of the n-th order harmonic components of each tone generated by the musical instrument of the first kind with a feature region for the power envelope parameters indicating the temporal power envelopes of the n-th order harmonic components of each tone generated by the musical instrument of the second kind and corresponding to each tone generated by the musical instrument of the first kind;

generating a synthesized separated audio signal for each tone using parameters other than the harmonic peak parameters and the power envelope parameters as well as the replaced harmonic peak parameters and the replaced power envelope parameters; and adding the synthesized separated audio signal and the residual audio signal to output a music audio signal including the audio signal of music instrument sounds generated by the musical instrument of the second kind.

18. A non-transitory computer readable recording medium recorded with computer program for music audio signal generation to be installed in a computer to cause the computer to execute the steps of:

extracting a separated audio signal including only an audio signal of each tone included in musical instrument sounds generated by a musical instrument of a first kind from a music audio signal including the audio signal of the musical instrument sounds generated by the musical instrument of the first kind, and also extracting a residual audio signal;

analyzing a plurality of parameters for each tone including at least harmonic peak parameters indicating relative amplitudes of n-th order harmonic components and power envelope parameters indicating temporal power envelopes of the n-th order harmonic components in order to represent the separated audio signal for each tone using a harmonic model that is formulated by the plurality of parameters;

creating harmonic peak parameters indicating relative amplitudes of n-th order harmonic components of each tone generated by a musical instrument of a second kind and power envelope parameters indicating temporal power envelopes of the n-th order harmonic components based on an audio signal of musical instrument sounds generated by the musical instrument of the second kind that is different from the musical instrument of the first kind, wherein the harmonic peak parameters and the power envelope parameters are required to represent, using the harmonic model, audio signals of the tones generated by the musical instrument of the second kind and corresponding to all of the tones included in the separated audio signal;

determining whether or not the musical instrument of the first kind and the musical instrument of the second kind belong to the same category of musical instruments;

creating replaced harmonic peak parameters by replacing a plurality of harmonic peaks included in the harmonic peak parameters indicating the relative amplitudes of the n-th order harmonic components of each tone generated by the musical instrument of the first kind with a plurality of harmonic peaks included in the harmonic peak parameters and indicating the relative amplitudes of the n-th order harmonic components of each tone generated by the musical instrument of the second kind and corresponding to each tone generated by the musical instrument of the first kind, and also creating replaced power envelope parameters by replacing a feature region for the power envelope parameters indicating the temporal power envelopes of the n-th order harmonic components of each tone generated by the musical instrument of the first kind with a feature region for the power envelope parameters indicating the temporal power envelopes of the n-th order harmonic components of each tone generated by the musical instrument of the second kind and corresponding to each tone generated by the musical instrument of the first kind;

generating a synthesized separated audio signal for each tone using parameters other than the harmonic peak parameters and the replaced harmonic peak parameters if the music instrument category determining section determines that the musical instrument of the first kind and the musical instrument of the second kind belong to the same category, or using parameters other than the harmonic peak parameters and the power envelope parameters as well as the replaced harmonic peak parameters and the replaced power envelope parameters if the music instrument category determining section determines that the musical instrument of the first kind and the musical instrument of the second kind belong to different categories; and adding the synthesized separated audio signal and the residual audio signal to output a music audio signal including the audio signal of music instrument sounds generated by the musical instrument of the second kind.

19. The music audio signal generating system according to claim 1, wherein the instructions further cause the processor to function as a musical score manipulating section configured to generate an audio signal of musical instrument sounds generated by the musical instrument of the first or second kind when a musical score is played with the musical instrument of the first or second kind, by utilizing the plurality of parameters for each tone stored in the separated audio signal analyzing and storing section.

20. The music audio signal generating system according to claim 19, wherein the musical score manipulating section is configured to create pitch parameters relating to pitches, duration parameters relating to durations, and timbre parameters relating to timbres among parameters constructing a harmonic model such that the created parameters may be suitable to each tone in a musical structure of another musical score.

* * * * *